United States Patent
Parker et al.

(10) Patent No.: US 6,775,593 B1
(45) Date of Patent: Aug. 10, 2004

(54) SERVICE PANEL WITH UTILITY CONTROLLER

(76) Inventors: Philip A. Parker, P.O. Box 129, Naples, TX (US) 75568; Tom S. Dunn, 6109 Sandydale, Dallas, TX (US) 75248

( * ) Notice: Subject to any disclaimer, the term of this patent is extended or adjusted under 35 U.S.C. 154(b) by 671 days.

(21) Appl. No.: 09/662,522

(22) Filed: Sep. 14, 2000

Related U.S. Application Data

(60) Provisional application No. 60/155,179, filed on Sep. 21, 1999.

(51) Int. Cl.[7] .............................................. G05D 11/00
(52) U.S. Cl. ................... 700/282; 137/624.11
(58) Field of Search .................. 303/19; 700/282; 340/870.01; 439/191, 192; 137/99, 624.11, 39

(56) References Cited

U.S. PATENT DOCUMENTS

| | | | |
|---|---|---|---|
| 3,417,212 A | * 12/1968 | Driscoll | 200/43.08 |
| 4,519,657 A | * 5/1985 | Jensen | 439/191 |
| 4,841,287 A | * 6/1989 | Flig et al. | 340/690 |
| 4,957,273 A | * 9/1990 | Sears | 251/129.04 |
| 5,126,934 A | * 6/1992 | MacFadyen | 700/11 |
| 5,331,619 A | * 7/1994 | Barnum et al. | 700/3 |
| 5,440,477 A | * 8/1995 | Rohrberg et al. | 700/83 |
| 5,861,683 A | * 1/1999 | Engel et al. | 307/38 |
| 6,237,618 B1 | * 5/2001 | Kushner | 137/1 |

* cited by examiner

*Primary Examiner*—Leo Picard
*Assistant Examiner*—Alexander Kosowski
(74) *Attorney, Agent, or Firm*—Slater & Matsil, L.L.P.

(57) ABSTRACT

A combination utility controller and service panel having an outer overall enclosure with a lockable door for limiting access thereto to authorized persons. Within the overall enclosure are two sub-regions that are separated from each other by gas-tight paneling. One of these sub-regions (i.e., a service region) contains at least one electrically-operated (e.g., solenoid-operated) valve that is serially connected within service utilities (e.g., water or gas) piping so as to control flow therethrough. The other sub-region (i.e., a utility controller region) contains electrical controls for controlling the valve(s) and communicating with other services such as an auxiliary monitoring system (e.g., a fire alarm system). Digital electronics capability is employed and facilitates provision of numerous features including: emergency shut down by anyone while permitting reset only by authorized personnel; modular construction so as to facilitate initial installation of the overall enclosure including the aforementioned service region followed subsequently (if desired) by addition of the utility controller module. Paneling and gasketing provide separate integrity of the subregions so that they may be included within the same overall enclosure while providing for safety from leakage

38 Claims, 32 Drawing Sheets

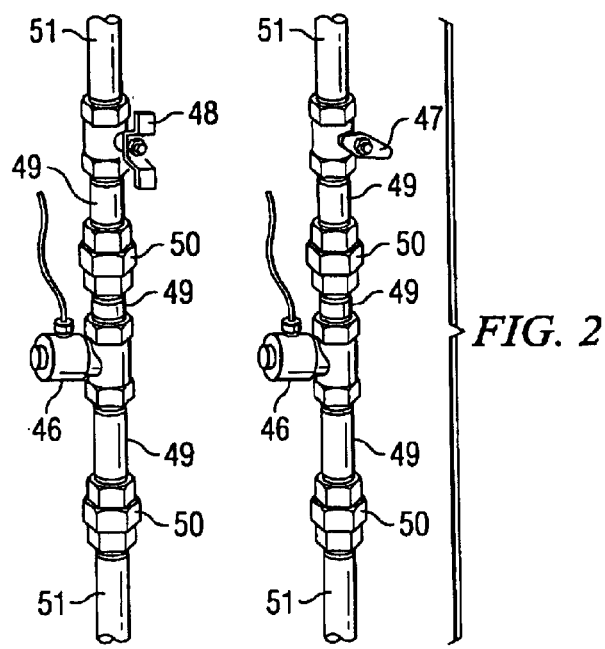
FIG. 2
FIG. 3
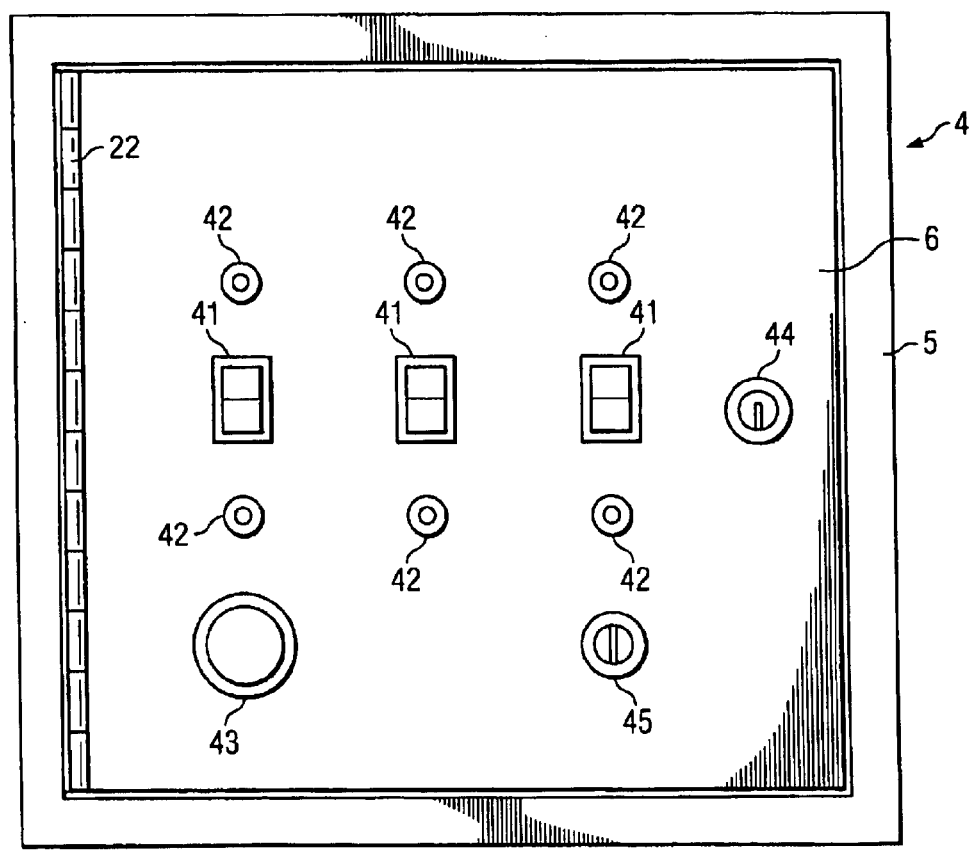

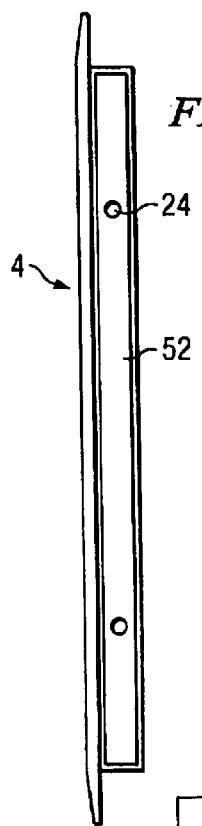
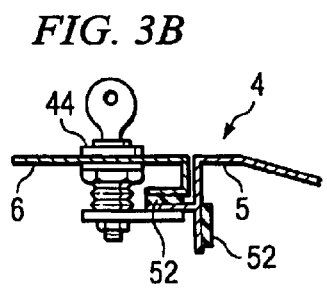
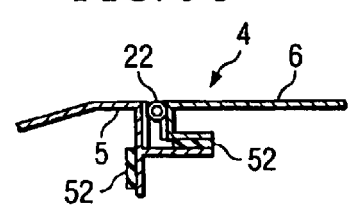
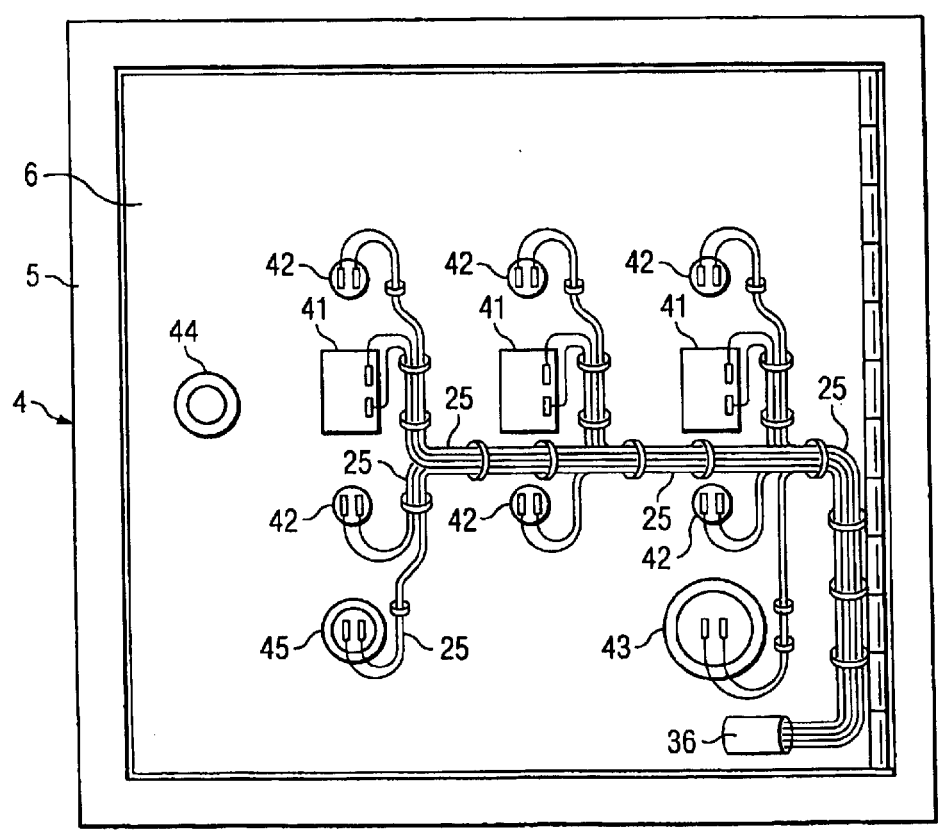

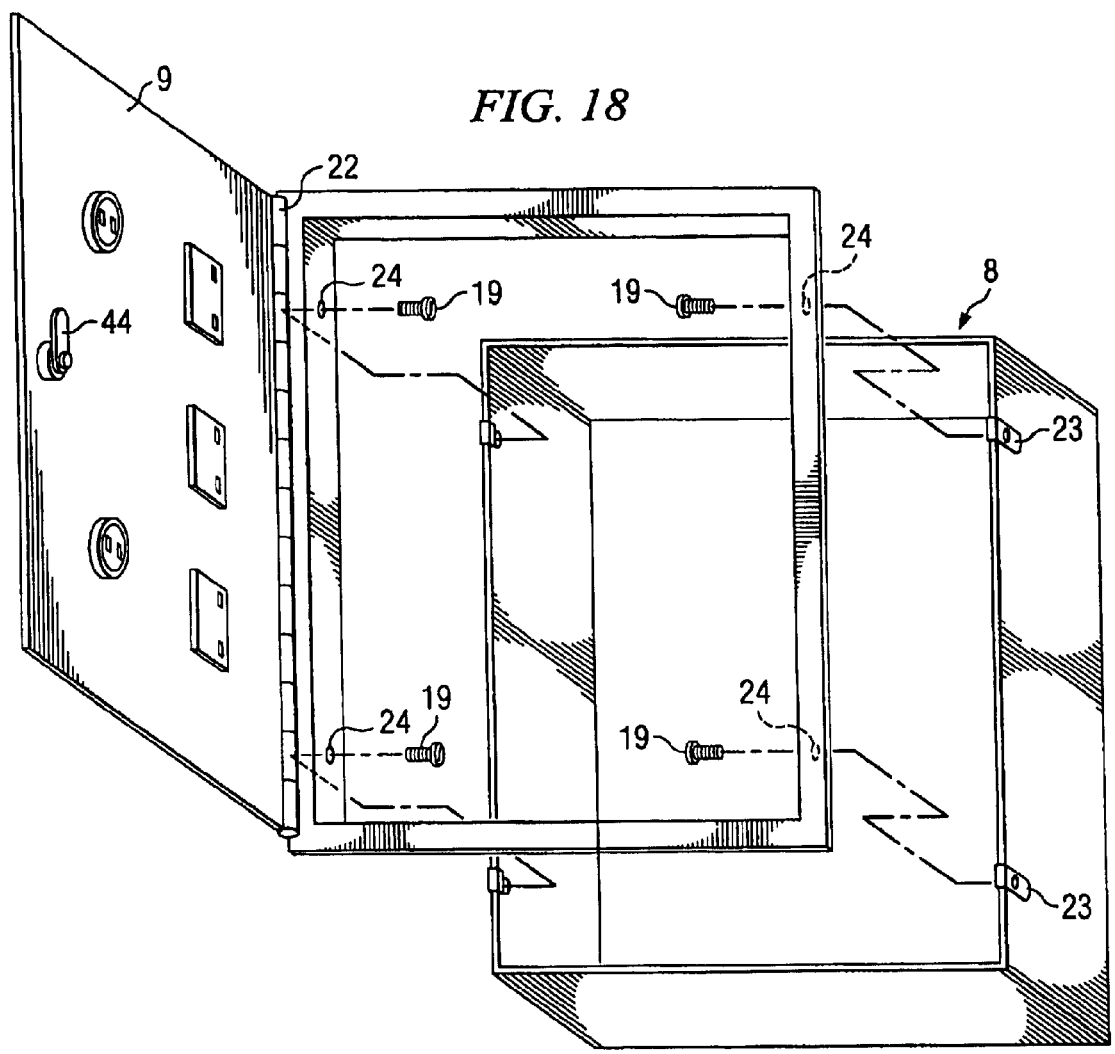

SERVICE PANEL WITH UTILITY CONTROLLER

CROSS REFERENCE TO RELATED APPLICATION

This application claims the benefit of prior filed U.S. Provisional Patent Application Serial No. 60/155,179 filed Sep. 21, 1999.

BACKGROUND OF THE INVENTION

This Invention relates to controlling utility services within buildings and more particularly to the logical control of such utility services.

Logical control of utility services within buildings has heretofore been proposed, illustrative of which are the proposals of U.S. Pat. No. 5,267,587 granted to Geoffrey P. Brown Dec. 7, 1993 and Pat. No. 5,331,619 granted to Thomas G Barnum et al on Jul. 19, 1994.

In the fields of plumbing and electrical it is typically required that various services within building structures be provided with a means of control so that individual areas receiving these services can be isolated from other areas of the building for the purposes of repair.

A common method for this isolation of electrical services is a wall switch or an electrical breaker located within a service panel that is located at some remote location within the building. These switches and breakers typically control lights, electrical outlets, and various pieces of equipment.

The common method for the isolation of plumbing services is a cut-off valve that is typically located above ceiling panels or concealed within a wall and accessed through a service panel. If the service is natural gas, then the cut-off valve can be located upon the roof. Cut-off valves control water to plumbing fixtures and equipment or gas to appliances.

In the field of construction of a building containing science laboratory rooms such as a school facility, it often is practical to control these services with another technique. This technique typically utilizes electrically activated contacts, relays, and solenoid valves. These electrical control apparatuses are typically controlled or activated by the turning ON or OFF of an electrical switch thereby energizing or de-energizing the apparatus. These switches can be located on a wall or concealed within a cabinet such as within an instructor's desk.

This alternative method of controlling these services regulates accessibility to the services. That is to say, a classroom instructor can determine those times when the students in the classroom need the various services. When a service is needed then the switch can be turned to the ON position and access to the service is granted. On the other hand, when a service is not needed then the switch remains in the OFF position and access is denied. This alternative control method helps to prevent accidental or unauthorized use of the service. These methods of controlling the access to these various services within a classroom have been considered the most practical.

However, there remain several disadvantages to the use of this type of control means. For instance, for maintenance purposes, if the cut-off valve and solenoid valve to the plumbing service is positioned in a concealed ceiling space then it becomes necessary to first determine the location of the valve. Then, one must utilize an elevating apparatus such as a ladder to gain access to the valve for maintenance purposes. If an emergency arises, then it becomes virtually impossible to close the valve within a short period of time. Also, if these valves are located upon the roof, there is the need to first gain access to the of before any maintenance can be performed.

Because the service and solenoid valves are remotely located away from the controlling switch, it becomes necessary for an electrician to install wiring from the controlling switch to the control valve. Very detailed coordination between the electrical and plumbing trades is needed. The exact locations of the valves must be coordinated. The actual voltage necessary to activate the solenoid valve must be determined. As is often the case, conflicts arise between the trades regarding the type of voltage required to activate the solenoid valve.

In addition, as is often the case in the installation of natural gas services, it is necessary that the concealed gas piping and valve apparatus, be within a secondary containment enclosure. In such a case when the gas service is controlled by an electrical solenoid, it is essential that not only the pipe and valve be sealed within the enclosure but also that the electrical conduit and wiring connections be likewise sealed. To properly accomplish this requirement, it is necessary that the outer conduit connector be airtight. But also, the wiring within the conduit must also be sealed airtight.

In the case of remote control of the electrical service to the classroom, typically, a remote set of contacts or a relay is utilized to control the electrical outlets. This relay is typically located within an access panel or box and located within the ceiling space. An electrical switch located within the room activates the relay.

Since it is the intent of this technique of controlling the various services to the classroom to restrict access to the services, then it becomes necessary to provide a method to deny or regulate access to the controlling switch. In other words, if the instructor does not choose to permit the use of a service such as the cold water outlets in the room, then the electrical control switch should be left in the OFF position. If it is desired that the activation of this switch be strictly enforced, then this switch must be located within a locked and/or concealed containment area such as the instructor's desk.

However, under these described conditions if an emergency arose, it would become necessary for the instructor to first unlock the containment area before the switch could be turned OFF and the service deactivated. Also, if the instructor were to be called away from the classroom momentarily, then there would be no means of deactivating the service in the event of an emergency.

Not only would this configuration create a potentially hazard, but also it restricts future repositioning and arrangement of the classroom. For instance, since the instructor's desk has electrical switches that are firmly connected with wiring through electrical conduits, it is impossible to move or reposition the desk without first disconnecting these conduits.

To help prevent such emergency situations electrical panic type push buttons are often positioned near the exit to the classroom. These panic buttons are typically connected to a building fire alarm system. Though these panic buttons may de-activate the services during emergency situations, it does become necessary to provide the wiring so that the remotely located solenoid valves and electrical relays can be disengaged.

Also to be considered is a situation whereby the instructor fails to deactivate a service at the end of the classroom day.

In such an event the service would remain active through non-use periods. If an emergency arose during these times then there would be no way to prevent a catastrophe.

To explain such a situation, suppose that near the end of the school day a student inadvertently leaves a cold water faucet open at a sink. And suppose that the drain to this sink has become clogged preventing the drainage of the water from the sink. By the beginning of the next school day a tremendous amount of water damage could occur within the classroom. Further, if the event occurred prior to an extended weekend or holiday, then this damage could likely extend to the entire school.

Now suppose that rather than a water outlet, there was left open a gas valve. The results of such an event could be catastrophic. Clearly, a better method to control these services to school science classrooms needs to be found.

There presently exists a means to remotely control and activate the various "HVAC" systems located within the building. This method is commonly referred to as "EMS" or energy management system. Though this "EMS" does have the capabilities to regulate time intervals when services can be activated, presently there does not exist a common link between the "EMS" and the activating switches for science classroom services.

SUMMARY OF THE INVENTION

The Service Panel with Utility Controller according to the invention hereof comprises an access service panel to contain the control components, the cut-off valves, the various pipe fittings, solenoids, relays, switches, wiring, connectors and locks; all of the major components needed to control and activate the various services that are utilized in a typical school classroom while ensuring the safety of the students in the classroom.

OBJECTS AND ADVANTAGES

Objects and advantages of our instant invention include:

A) to provide an accessible service panel with a logic controller containing the major components needed for the control of the various services typically utilized in school science classrooms;

B) to provide a service panel with a logic controller where the components are pre-selected and pre-assembled to insure compatibility thereby eliminating conflicts among the various trades involved in the installation and further permitting ease in the installation process;

C) to provide a service panel with a logic controller having the means to insure the safety of the students occupying the classroom.

Further objects and advantages are to provide a Service Panel that restricts the unauthorized use of the various services to the science classroom. The door-mounted indicators provide for ease in determining the services that are activated. Because a key is needed to activate but not de-activate the services, usage of the service panel is made simple. Restricted access to the interior compartment of the Service Panel is further limited to authorized maintenance personnel. This feature prevents inadvertent injury to non-authorized persons. It further prevents potential damage to the interior components of the service panel. However, because the plumbing cut-off and solenoid valves are located within the panel compartment, their maintenance is made easy.

Because control and access to the panel is restricted, the Service Panel with Utility Controller can be located in plain sight and near the exit to the classroom. Therefore, the panic button mounted upon the door of the Service Panel will deactivate the services in the event of an emergency. This panic button can also be connected to the building fire alarm system, thus notifying authorities in the event of an emergency. Further, after the pressing of the panic button, it is necessary to reset the Utility Controller prior to re-activation of the services. Because this reset switch is located within the Service Panel, the possible re-activation during an emergency is avoided.

Because the Utility Controller contains the means to regulate the time of day that the Service Panel can be activated and de-activated, the risk that a service is inadvertently left active is avoided.

Another further advantage of the Service Panel is that, according to one embodiment, within it is located the Utility Controller which houses the electronic controller and other electrical components. This unique design prevents potential water damage to the components due to leakage in water service piping.

Further, requirements that natural gas piping be within a secondary containment enclosure is achieved. Though the Utility Controller has exposed electrical wiring that enters the box through non-sealed conduit, it has a gasketed door that once closed and secured seals it from the main Service Panel. The Service Panel having a gasketed door panel thus becomes the required secondary containment enclosure.

Though the electrical relay for control of electrical outlets is remotely located, the control switch and needed wiring and other control components are still centrally located with the switches for the other various services.

Further, since the Service Panel and Utility Controller are provided as individual components; the Service Panel with pre-assembled piping, the door assembly, and the Utility Controller; there is limited concern over the potential damage to various components during the rough-in stages of the construction of the building. In other words, components are assembled as needed rather than at one time which is the case in many other applications.

Also, because the Service Panel and Utility Controller contain pre-wired components with disconnect switches, there is ease in maintenance.

Further objects and advantages of the invention will become apparent from the consideration of the drawings and ensuing description.

BRIEF DESCRIPTION OF THE DRAWINGS

FIG. 3 through FIG. 3e show the door panel assembly

FIG. 18 is an alternative embodiment of door panel used for the Utility Controller.

REFERENCE NUMERALS IN THE DRAWINGS

Figure 1:
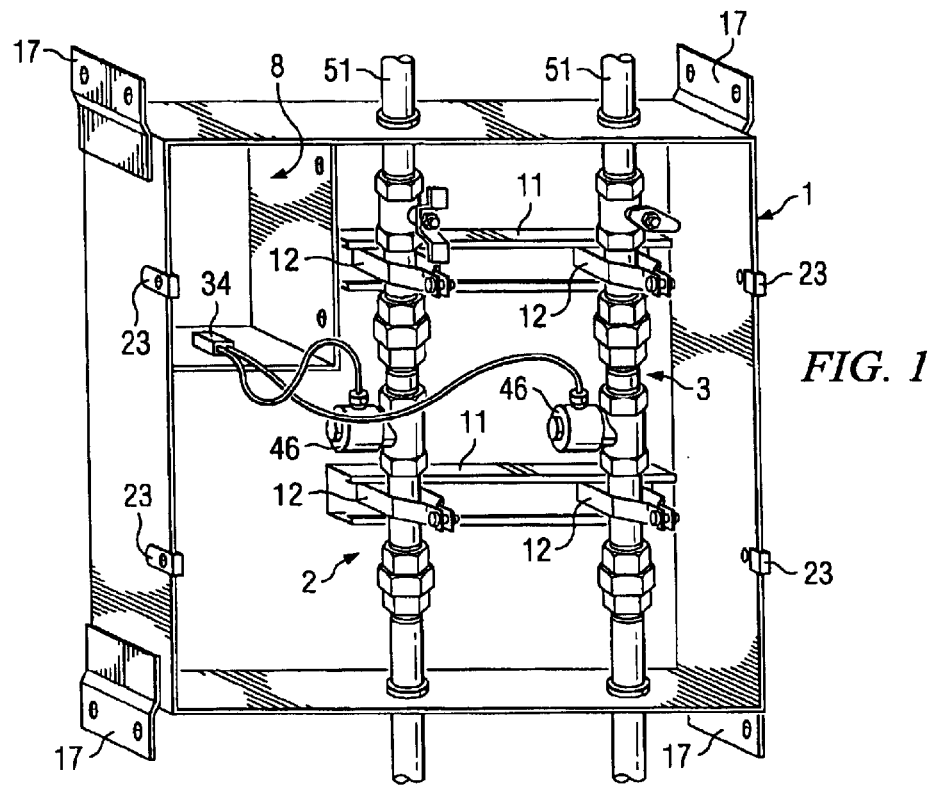
FIG. 1 shows the Service Panel.

1 Service Panel
2 water cut-off assembly
3 gas cut-off assembly
4 door panel assembly
5 door frame
6 door panel
7 optional digital time clock
8 Utility Controller
9 secondary door
10 electronic controller
11 channel strut
12 two piece pipe clamp
13 rubber grommet
14 threaded nut
15 flat washer
16 sheet metal screw
17 mounting bracket
18 threaded stud
19 machine screws
20 mounting screw
21 mounting spacer
22 continuous hinge
23 retaining clips
24 mounting hole
25 wiring harness
26 low voltage wire
27 low voltage transformer
28 combination switch/circuit breaker
29 electrical conduit
30 power terminal
31 power plug
32 reset switch
33 solenoid terminal
34 solenoid plug
35 door panel terminal
36 door panel plug
37 controller power terminal
38 secondary terminal
39 reset terminal
40 conventional digital timer
41 control switch
42 Indicator (LED)
43 panic button assembly
44 keyed lock
45 keyed switch
46 solenoid
47 gas cut-off
48 water cut-off valve
49 threaded pipe nipple
50 threaded union
51 service piping
52 gasket material
53 line voltage wiring
54 grounding wire
55 wiring clamp
56 remote relay terminal
57 "EMS" terminal
58 fire alarm terminal
59 conventional backflow preventer
60 metal wall framing studs
61 liquid tight fitting
62 threaded nipple
63 locking nut
64 Door lever with lock
65 Alternative DC power terminal
66 Remote relay Major Electronic Components of the Electronic Controller U 1 Programmable Logic Device
U 2 Clock Oscillator
U 3 Buffer
U 4 Opto Oscillator
U 5 DP/DT/NO Relay
U 6 DP/DT/NO Relay
U 7 DP/DT/NO Relay
U 8 Switching Regulator
U 9 Diode Rectifier

DESCRIPTION OF THE INVENTION—PREFERRED EMBODIMENT

The invention is a Service Panel having an integral Utility Controller for controlling the various services typically utilized in a science classroom. The Panel, doors and other containment components are preferably constructed of welded sheet metal. They contain the various components needed for the control of these services. FIG. 1 through FIG. 1c show various views and aspects of Service Panel 1.

As shown in FIG. 1, the interior of Service Panel 1 houses the water cut-off valve assembly 2 and the gas cut-off valve assembly 3. These assemblies are secured in place to a section of channel strut 11 with two-piece pipe clamps 12. Channel strut 11 is secured to the rear of the service panel. Wiring to solenoids 46 is assembled and terminated with solenoid plug 34. Utility Controller 8 is positioned in the upper portion of the service panel. Retaining clips 23 are positioned along the sides. Mounting brackets 17 are positioned at each corner of the Service Panel.

Figure 1A:
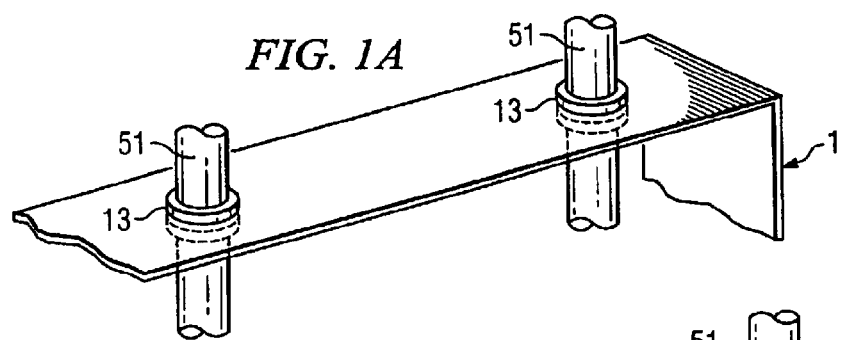
FIG. 1a through FIG. 1f show various aspects of the Service panel

As demonstrated in FIG. 1a the entry points of service piping 51 as it penetrates Service Panel 1 are sealed airtight by the use of rubber grommets 13. Likewise but not shown, the exiting holes at the base of the Service Panel utilize the same grommets.

Figure 1B:
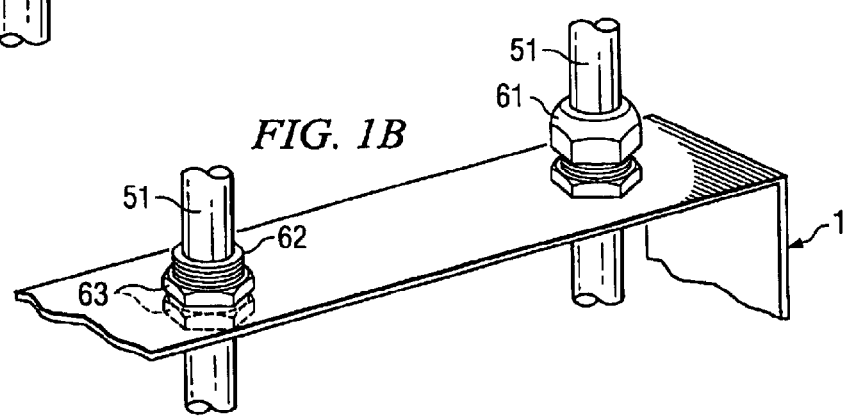
Figure 1C:
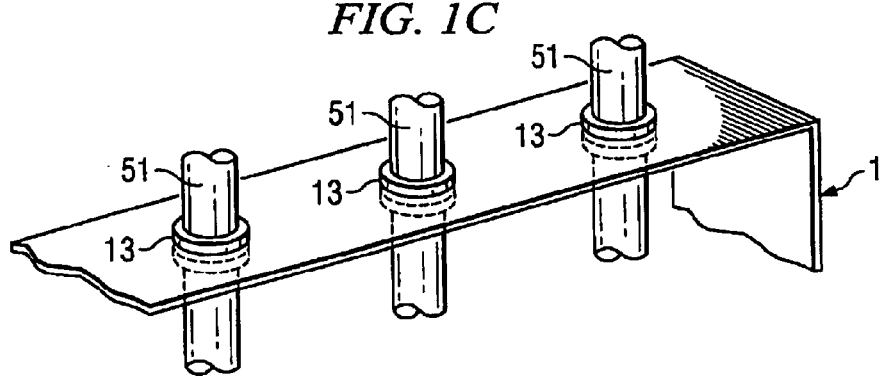

Further, as demonstrated in FIG. 1b, a sleeving threaded nipple 62 secured to Service Panel 1 with locking nuts 63 are used at the entry points of the service piping 51 as it penetrates the Service Panel. As before mentioned, this technique is utilized when it is necessary to provide airtight sleeving around the gas service piping. A liquid tight fitting is used to seal the penetration of the water service piping as it enters the Service Panel. This technique will be discussed further in other figures of the description of the invention.

FIG. 1c is similar to the view shown in FIG. 1a except having three sets of service piping 51. In this illustration, each of these pipes is sealed airtight by the use of rubber grommets 13.

Figure 1D:
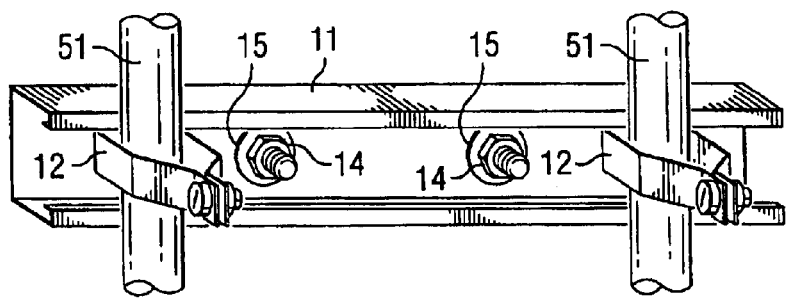

FIG. 1d is an isometric view of channel strut 11 detailing the technique used to secure the service pipes 51 to the strut with two piece pipe clamp 12. The strut is secured to the back of the Service Panel with threaded nuts 14 and flat washers 15.

Figure 1E:
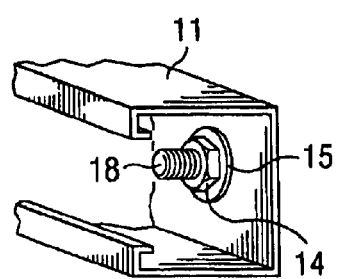

FIG. 1e is an isometric view of a section of the channel strut. This view demonstrates the method used to secure channel strut 11 to threaded studs 18 with flat washer 15 and threaded nut 14. These threaded studs are secured to the back panel of the Service Panel.

Figure 1F:
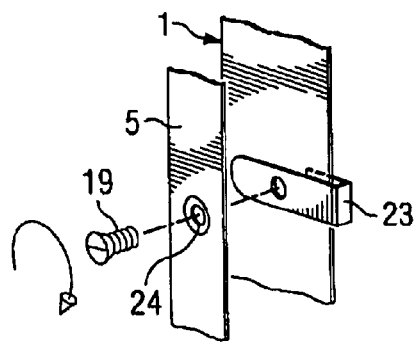

FIG. 1f is an isometric view of the retaining clip 23 utilized to secure door panel assembly to Service Panel 1. The retaining clip is placed over the edge of the Service Panel side to provide tapped threads whereby machine screw 19 can be inserted through mounting hole 24 in doorframe 5 hence securing the door panel assembly to the Service Panel.

Figures 1, 6A:
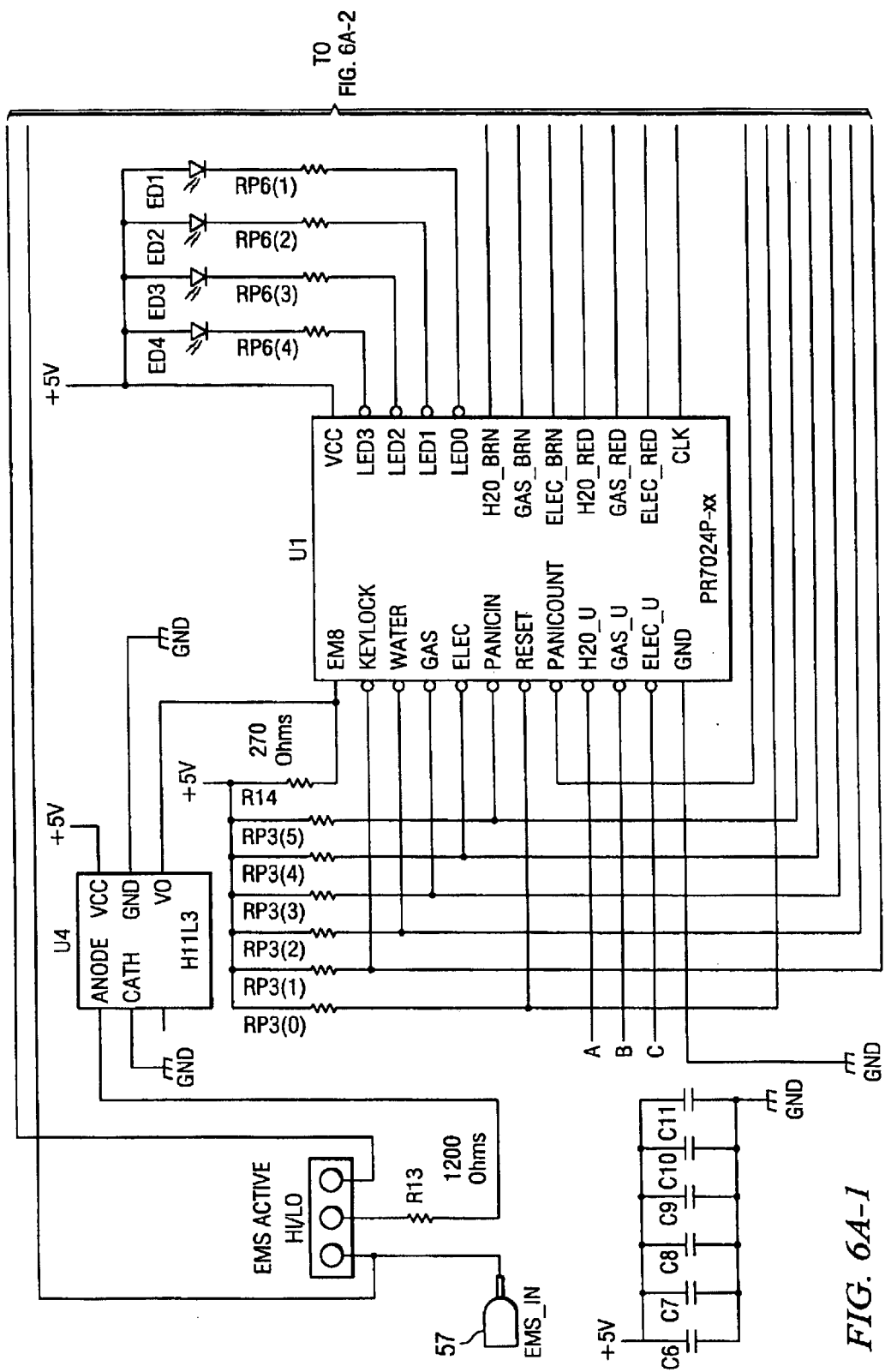
FIG. 6a through FIG. 6e show the electronic controller and the wiring diagrams for the controller. Due to the complexity of the electronic controller, the reader will note that in many figures, an image of the controller will appear for reference purposes only without an attempt to fully describe the controller. The drawing Figures are illustrated in that fashion so that the reader will fully understand the placement and the electrical connections between the controller and other components of the laboratory service panel.
Figures 2, 6A:
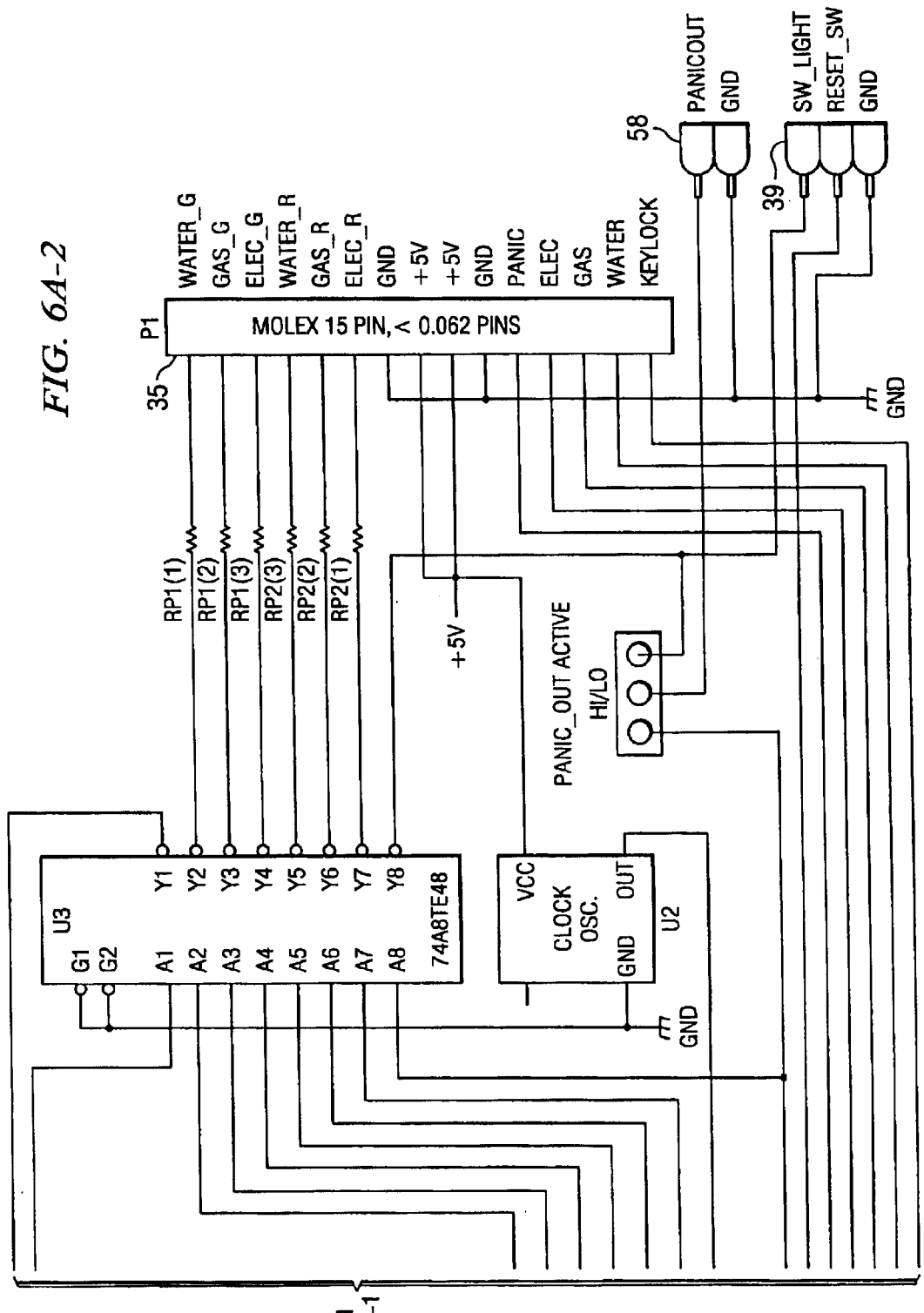
FIG. 2 shows the cut-off assemblies.

Turning to the exploded view, FIG. 2 of the water cut-off assembly 2 and the gas cut-off assembly 3. The water cut-off valve 48; the solenoid 46; assorted lengths of threaded pipe nipples 49; and two threaded unions 50 comprises the water cut-off assembly. In turn, the gas cut-off valve 47; the solenoid 46; assorted lengths of threaded pipe nipples 49; and two threaded unions 50 comprises the gas cut-off assembly. Each solenoid has wire leads.

Now, turning to door panel assembly 4. FIG. 3 shows a plane frontal view of door panel assembly 4. Door panel 6 is affixed to doorframe 5 with continuous hinge 22. On the surface of the door panel are mounted three control switches 41 for controlling the different services. These switches are rocker type being normally open, single pole, single throw. One switch controls the electrical service. The second controls the domestic cold water service while the third controls the gas service. Above each control switch is an indicator (LED) 42 that shows whether the service is in the active state or not. Below each control switch is a second Indicator (LED) 42 to indicate if the service was active during a Scheduled shutdown. A keyed lock 44 is mounted at the side opposite to the continuous hinge. Keyed switch 45 is positioned on the lower area of the door panel. This keyed switch is a normally open key activated single pole, single throw switch with momentary contact having the capability of being removed only from the OFF position. Adjacent to this keyed switch is located panic button assembly 43. This panic button is of a conventional design that is typically utilized in similar conventional applications. It is a normally open single pole momentary push button switch. Because of its common usage in the electrical industry, no further description is provided. All switches, lights and locks are mounted to the door panel using common means and methods as provided by the manufacturers of these components.

FIG. 3a is a side sectional view of the door panel assembly 4. Gasket material 52 is affixed to the exterior edges of doorframe 5. Mounting holes 24 are positioned along the inner surface of the doorframe.

FIG. 3b is another sectional view of door panel assembly 4. Keyed lock 44 is displayed in the locked position securing door panel 6 to doorframe 5. Gasket material 52 is adhered to the outer edge of doorframe 5. Gasket material 52 is likewise adhered to the inner of door panel 6.

FIG. 3c is a sectional view of door panel assembly 4 with door panel 6 in the closed position. This view demonstrates the mounting of the door to the frame with continuous hinge 22. Gasket material 52 is adhered to the inner frame of door panel 6 thereby when the door is closed an airtight seal is gained. Gasket material 52 is likewise adhered to the outer edge of doorframe 5. This gasket will make the control panel air tight when the door panel assembly is mounted upon the control panel. This mounting technique will be discussed further in FIG. 7.

FIG. 3d shows a plane back view of door panel assembly 4. Low voltage wiring 25 to control switches 41, keyed switch 45, panic button assembly 43, and Indicators (LED) 42 are visible. A wiring harness 25 collects these low voltage wires. They are terminated with door panel plug 36.

Figure 3E:
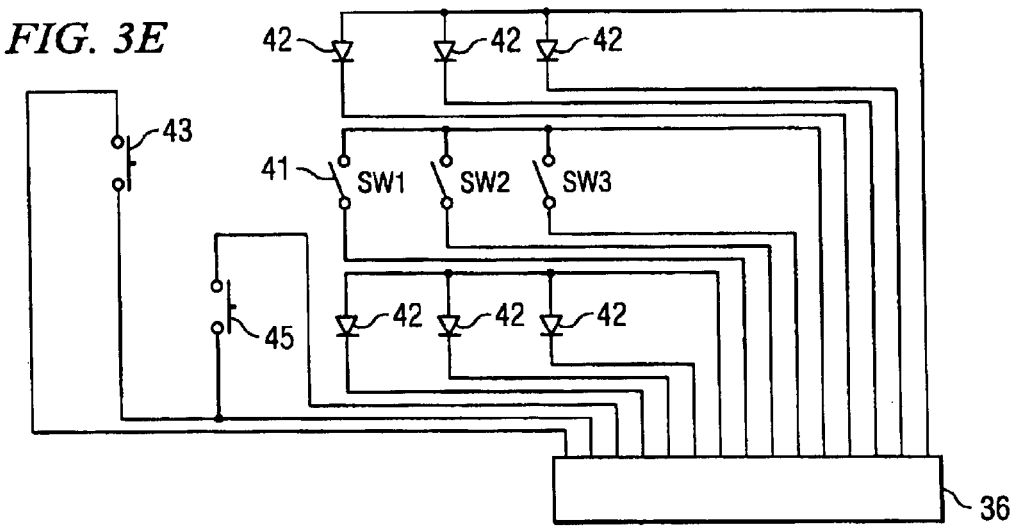

FIG. 3e is the wiring schematic for door panel assembly 4. The reader can see that the three control switches 41 have a common lead wire with individual service wire that continues back to the door panel plug. The same is true of the wiring technique for the two sets of three Indicators (LED) 42. Likewise, the panic button assembly 43 and keyed switch 45 have a similar wiring configuration.

Figure 4:
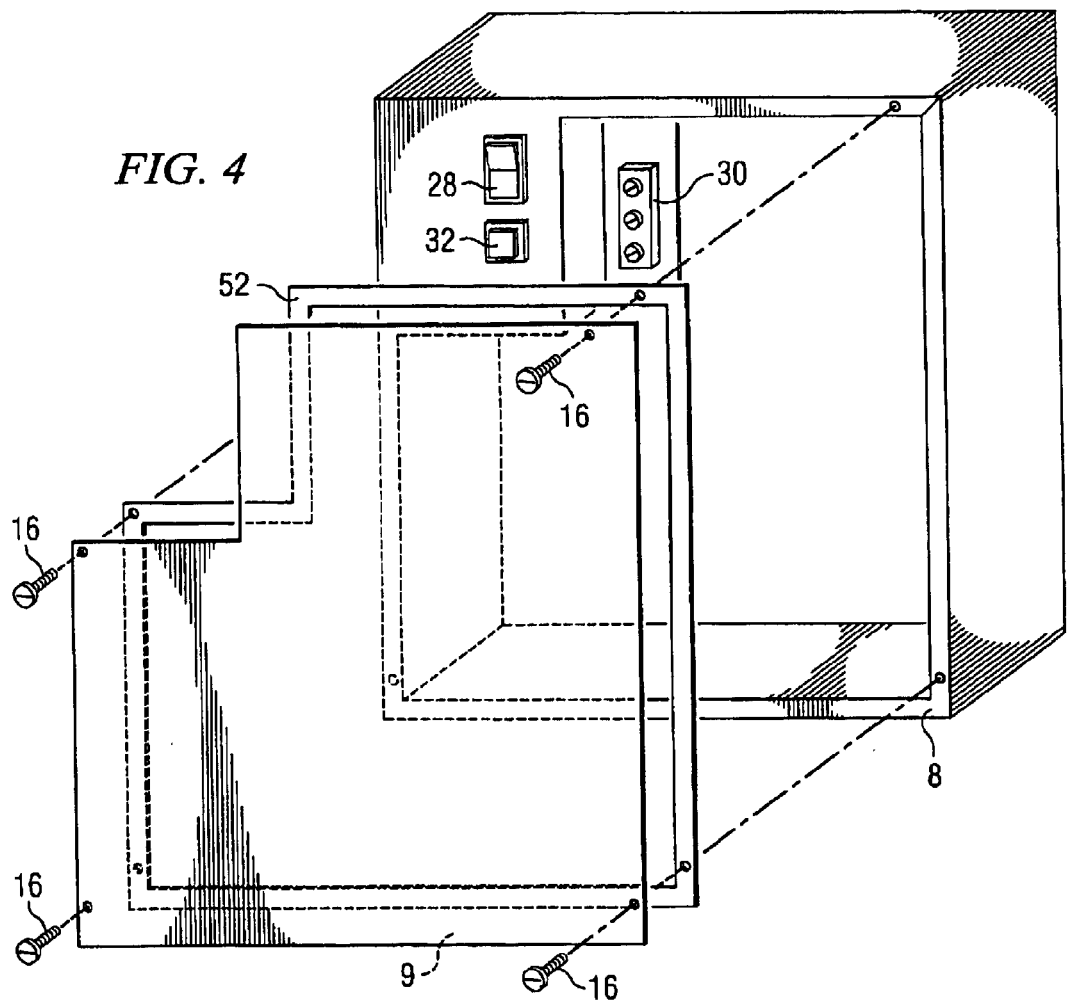
FIG. 4 through FIG. 4c show the Utility Controller

FIG. 4 shows a frontal view of the assembly of secondary door 9 onto Utility Controller 8. The secondary door is affixed with sheet metal screws 16 and sealed with gasket material 52. On the surface of the Utility Controller is combination switch/circuit breaker 28 and reset switch 32. The positioning of these switches along with the offset cut of the surface of the secondary door permits the door to be secured in place while allowing accessibility to these switches. Power terminal 30 is viewed in the recessed portion of the Utility Controller.

Figure 4A:
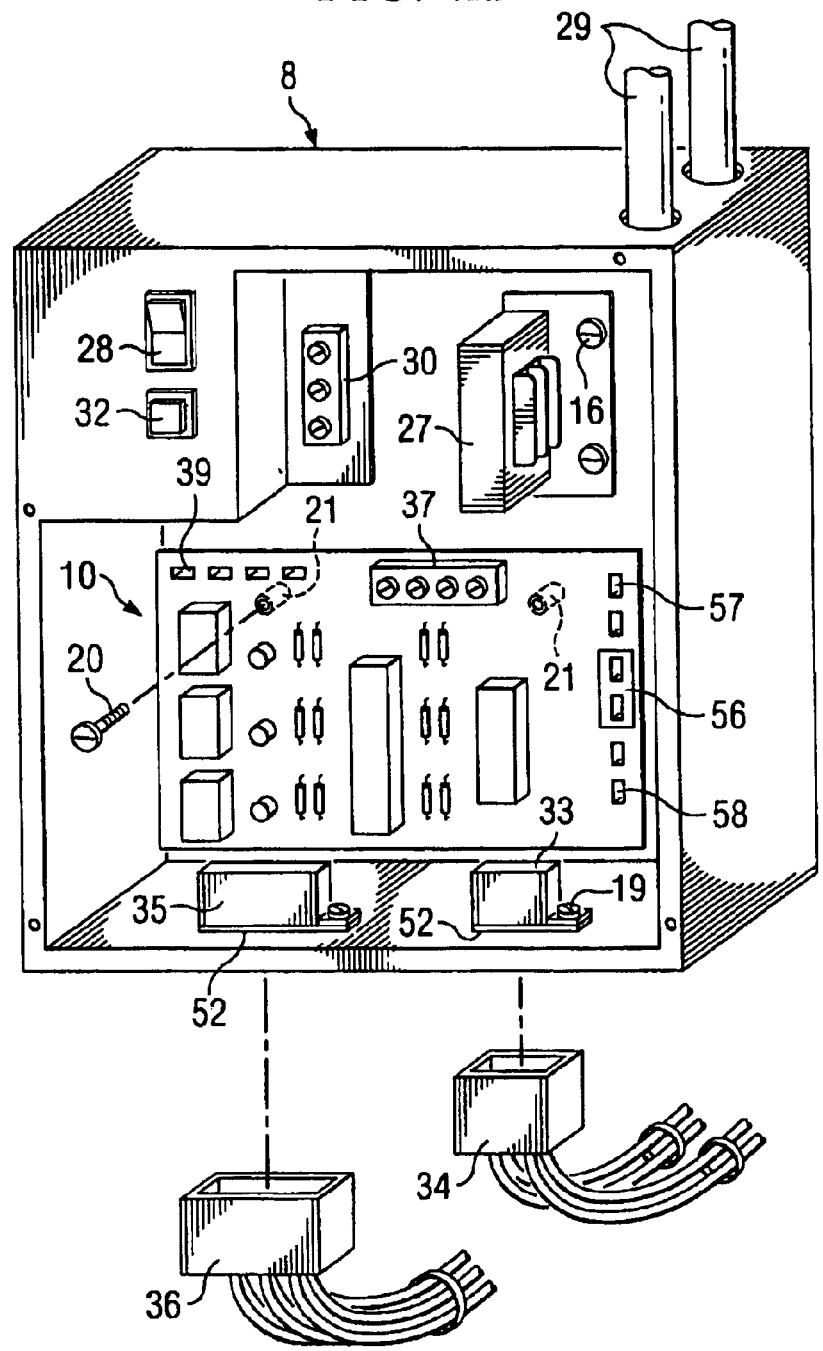

Now turning to the interior of the Utility Controller. FIG. 4a is an interior isometric view of Utility Controller 8 displaying the mounted electronic controller 10. Low voltage transformer 27 is secured in the upper portion of the secondary box with sheet metal screws 16. Power terminal 30 is located on a recessed shelf of the surface of the Utility Controller. Mounting spacers 21 are positioned on the back of the box. Mounting screws 20 are inserted through the surface of the electronic controller 10 and into the mounting spacers. Also viewed are the two openings in the top of the box. Electrical conduit 29 is affixed to these openings by conventional means. The front opening facilitates the entry of the line voltage wiring while the rear opening permits entry of low voltage wiring. Solenoid terminal 33 and door panel terminal 35 which are integral parts of the electronic controller 10 are positioned through holes in the base of the Utility Controller. Gasket material 52 is sandwiched between these terminals and the Utility Controller and machine screws 19 are utilized to make them secure. This mounting technique further secures the electronic controller in its mounted position. Once secured to the box, solenoid plug 34 and door panel plug 36 can be inserted into their respective terminals. These plugs are the matched opposite end of their respective terminal. The wiring connections for terminals 30, 37, 35, 33, 39,56, 57, and 58 are further detailed on FIG. 4b and discussed in the operation section of the specifications.

Figure 4B:
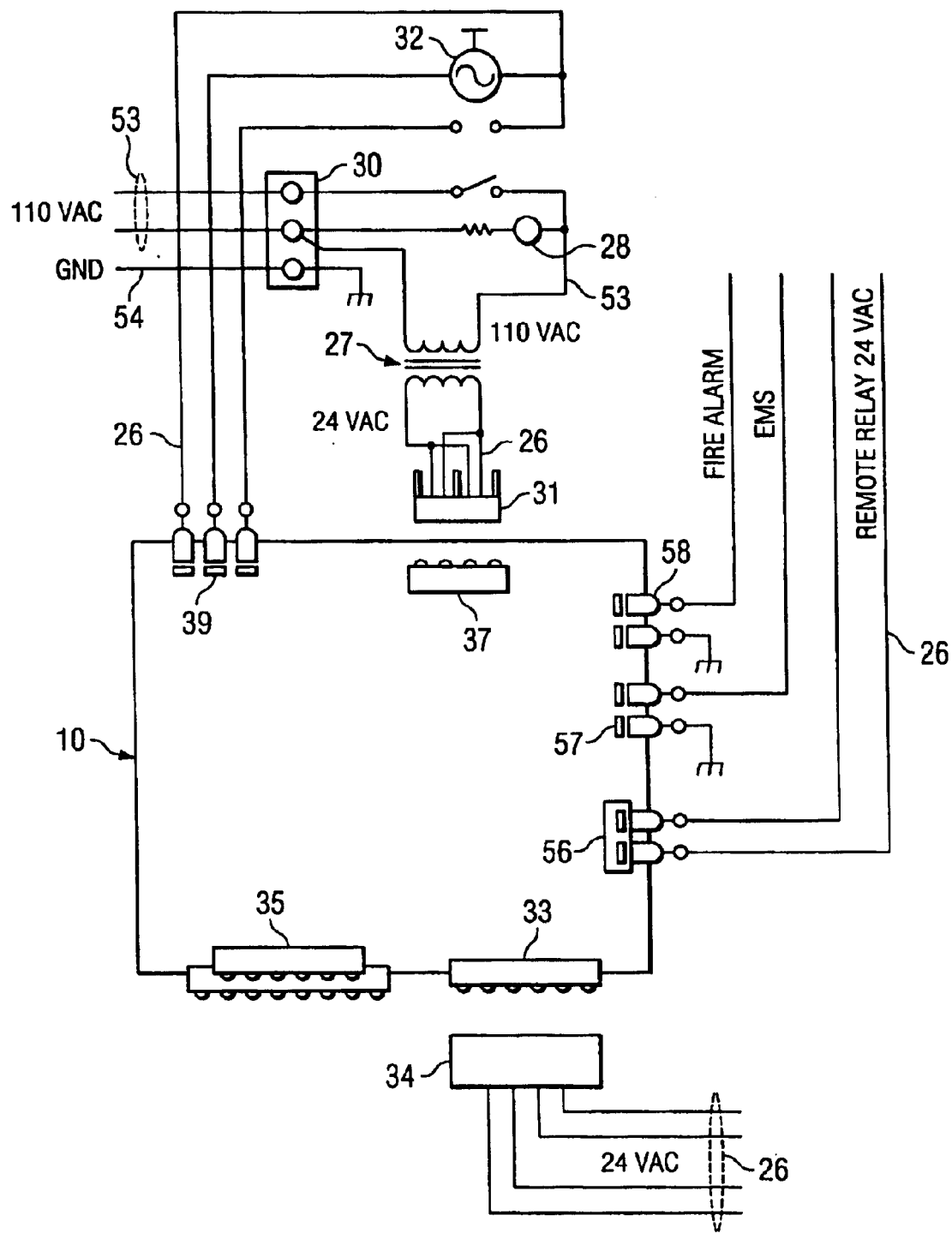

FIG. 4b and further figures show the various wiring diagrams for the Utility Controller. To avoid repetition in the description of the preferred embodiment as well as alternate embodiments of the invention, detail is given for the wiring diagram for the preferred embodiment while only modifications are described for the various additional and alternative embodiments.

FIG. 4b shows the wiring diagram when 24 VAC is used to activate the solenoids and remotely located electrical relay. Wiring from the building fire alarm is field connected to fire alarm terminal 58. Likewise, Wiring from the "EMS" system is field connected to "EMS" terminal 57. Low voltage wiring 26 is field installed and extended from remote relay terminal 56 to a remotely relocated and field installed electrical relay. Line voltage wiring 53 and grounding wire 54 are field installed and connected to power terminal 30. The line wire is routed through combination switch/circuit breaker 28. A common line is also connected to this switch so that the ON-OFF indicator light of this switch will be illuminated when in the ON position. Line voltage wiring 53 is thus routed through this switch to low voltage transformer 27 while the common lead is connected directly to the transformer. Low voltage wiring 26 is connected from this transformer to controller power terminal 37 with power plug 31. Power plug 31 is a polarized plug insuring proper fitting to the terminal. Because this embodiment of the invention utilizes low voltage current to activate the solenoids and remote electrical relay, leads on the power plug are interconnected. Low voltage wiring 26 is extended from reset terminal 39 to reset switch 32. Two leads with a single ground are used. This allows the normally open single pole momentary reset push button switch to reset the electronic controller from the panic state "1111" to the shutdown state "0000" state when pressed. The LED within the button of the reset switch remains illuminated until reset occurs at which time it loses illumination. Solenoid plug 34 is connected to solenoid terminal 33. Low voltage wiring 26 thus extends to the solenoids. Door panel terminal 35 receives door panel plug 36 (not shown).

Figure 4C:
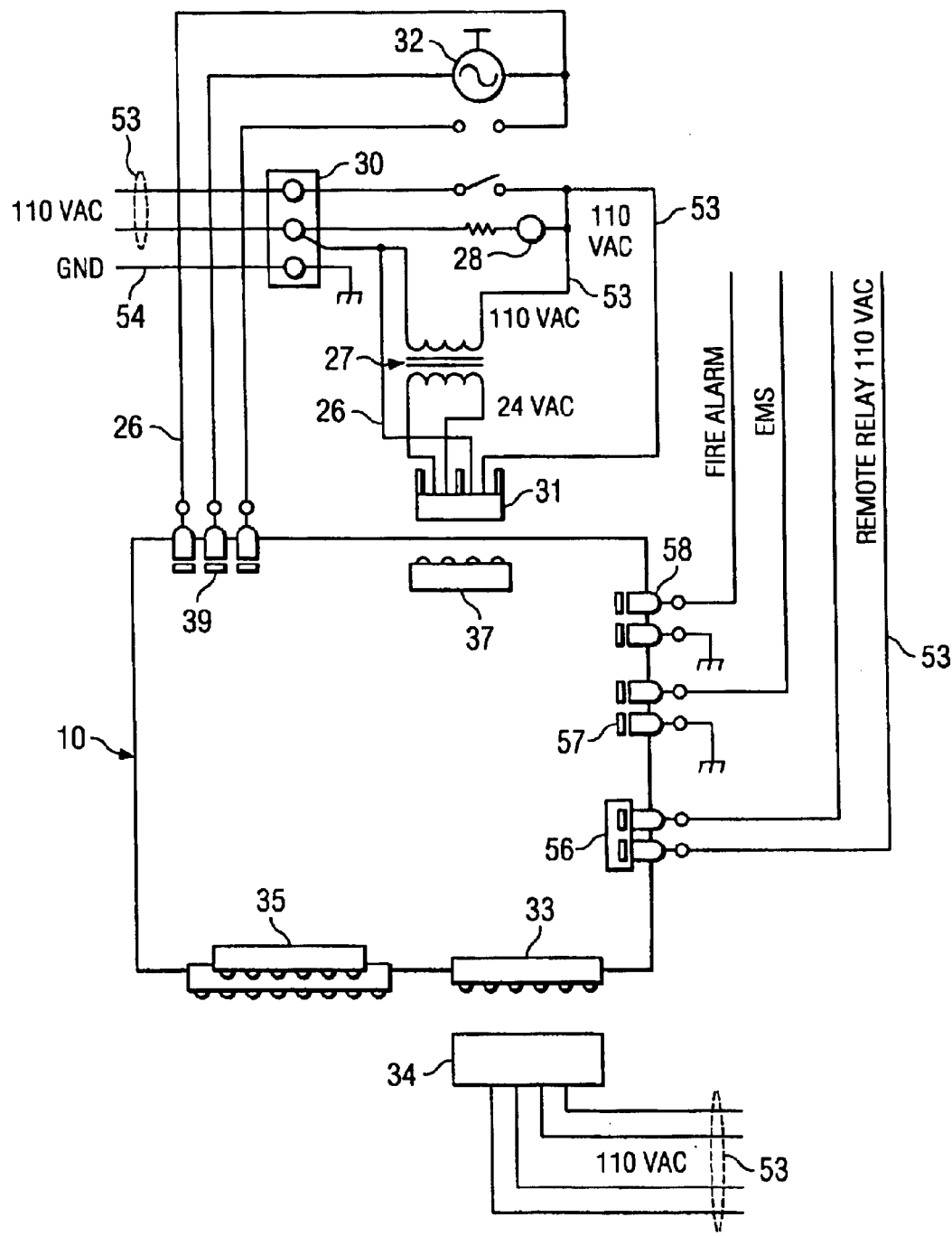

FIG. 4c shows the wiring diagram for Utility Controller 8 when 110 VAC is used to activate the solenoids and remotely located electrical relay. In this embodiment, line voltage wiring 53 extends from combination switch/circuit breaker 28 to one set of contacts on power plug 31. In this instance, these leads are not interconnected with the low voltage wiring 26 from low voltage transformer 27. Line voltage wiring 53 thus extends from solenoid plug 34 and remote relay terminal 56.

Figure 5:
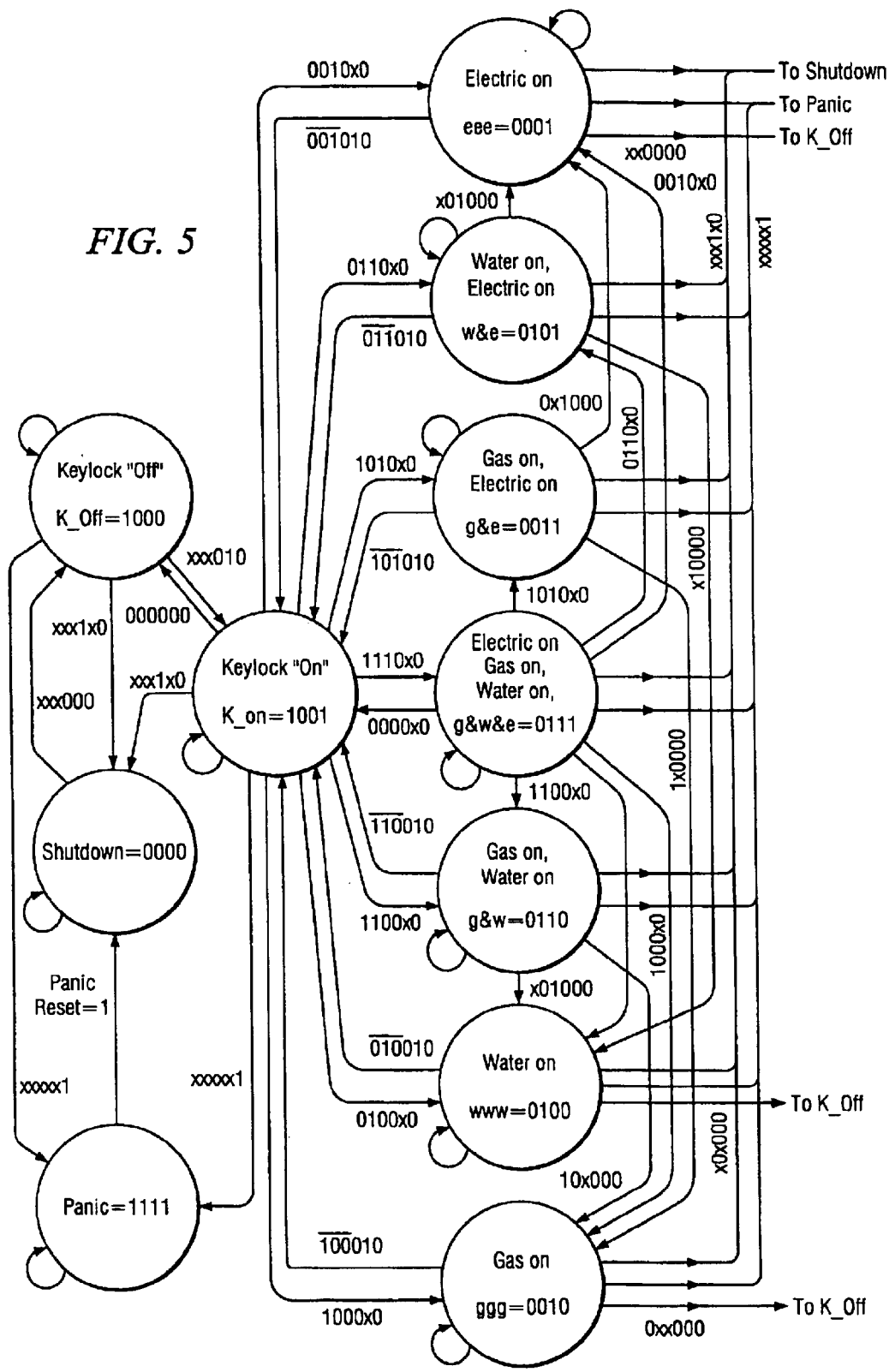
FIG. 5 is the sequential state controller diagram for the electronic controller.

FIG. 5 is the aforementioned sequential state controller diagram for the controller. To facilitate understanding thereof, it should be noted that Operation of the Utility Controller or the Laboratory Service Panel is achieved by moving from one logical "state" to another, based on inputs to the system. As inputs to the system change, the state of the system changes. If no inputs are changing, the system remains in the current state. There are sixteen (16) different states used in this system, which are encoded using four digital bits. The encoding is:

| Decimal | MSB - LSB | State name | Outputs turned on: |
| --- | --- | --- | --- |
| 0 | 0000 | Shutdown | None |
| 1 | 0001 | EEE | Electric relay |
| 2 | 0010 | GGG | Gas relay |
| 3 | 0011 | G&E | Gas & Electric relays |
| 4 | 0100 | WWW | Water relay |
| 5 | 0101 | W&E | Water & Electric relays |
| 6 | 0110 | G&W | Gas & Water relays |
| 7 | 0111 | G&W&E | Gas, Water, & Electric relays |
| 8 | 1000 | K_off | None |
| 9 | 1001 | K_on | None |
| 10 | 1010 | Delay2 | Water relay |
| 11 | 1011 | Delay1 | Water & Electric relays |
| 12 | 1100 | Shut2 | Water relay |
| 13 | 1101 | Shut4 | Electric relay |
| 14 | 1110 | Shut1 | Water & Electric relays |
| 15 | 1111 | Panic | Alarm output |

The circuits preferably employed are a "Moore" type, with the output conditions based only on the current state the sequential state controller is in, and not on a combination of the current state and input conditions. This aids in preventing asynchronous noise from causing states to erroneously change. The components used in the "Logic" section are shown below in Table 2.

| Reference Designator | Component Type | Function Provided |
| --- | --- | --- |
| U1 | ICT7024 | Programmable logic device |
| LED[1–4] | LED | Light emitting diodes, with internal current limiting resistors |

Indicators (LED1, LED2, LED3, and LED4) provide a visual indication of the present state. Since the sink current (Io1) of the logic device (U1) is much greater than the source current (Ioh) the LED's are lighted by switching the cathode of the LED to Vol. The anode is directly connected to the +5V supply line. These LED's have internal current limiting resistors to allow them to operate directly off +5V supplies.

The inputs to the sequential state controller are the three utility switches, the enabling keyswitch, the panic button (41, 45, and 43 respectively in FIG. 3), and the energy management system input (EMS). The inputs to the logic device are registered so the entire device is synchronous. The sequential state controller diagram in FIG. 5 shows the progression through the states as a function of the input variables.

Figures 1, 6B:
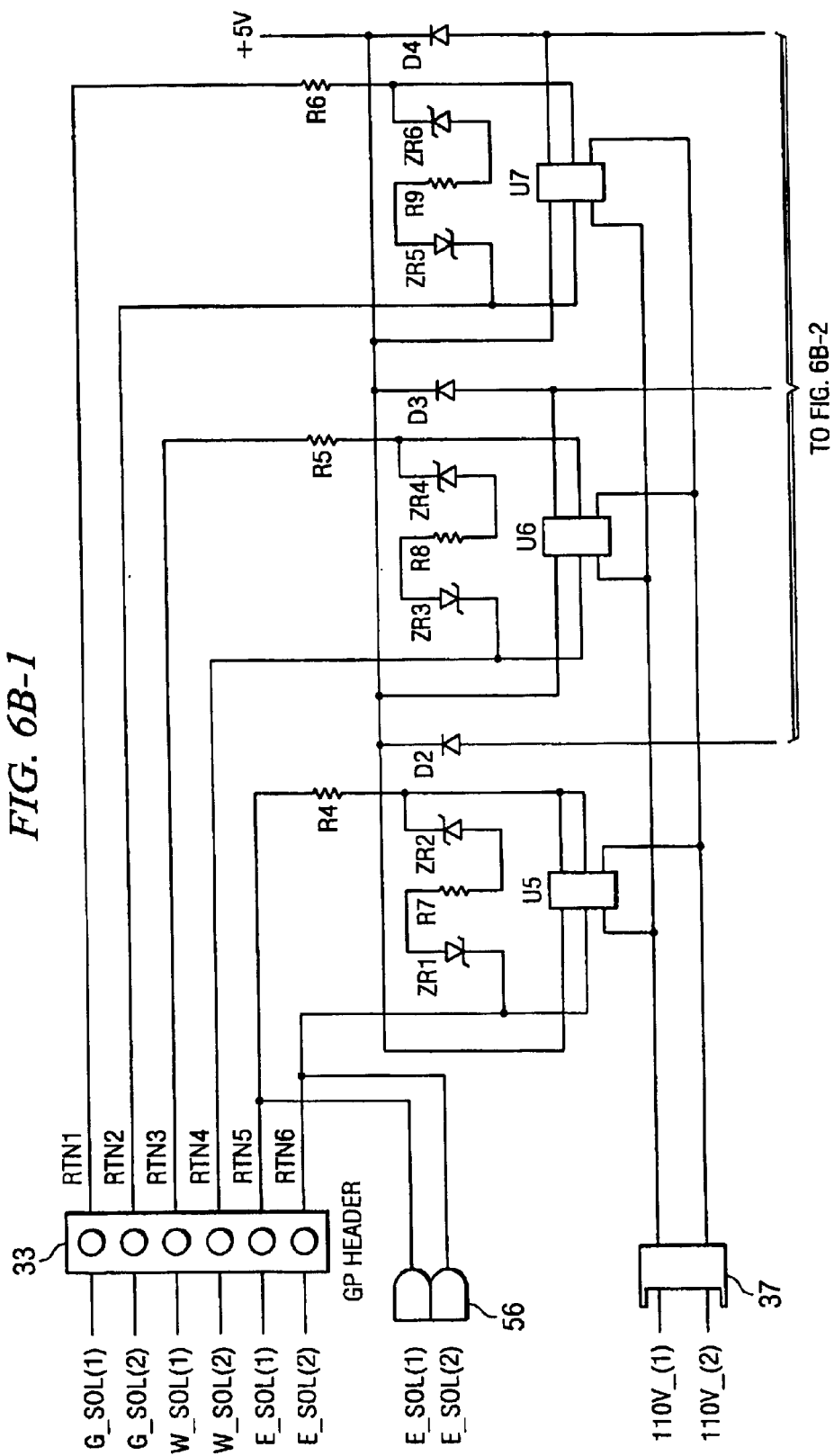
Figures 2, 6B:
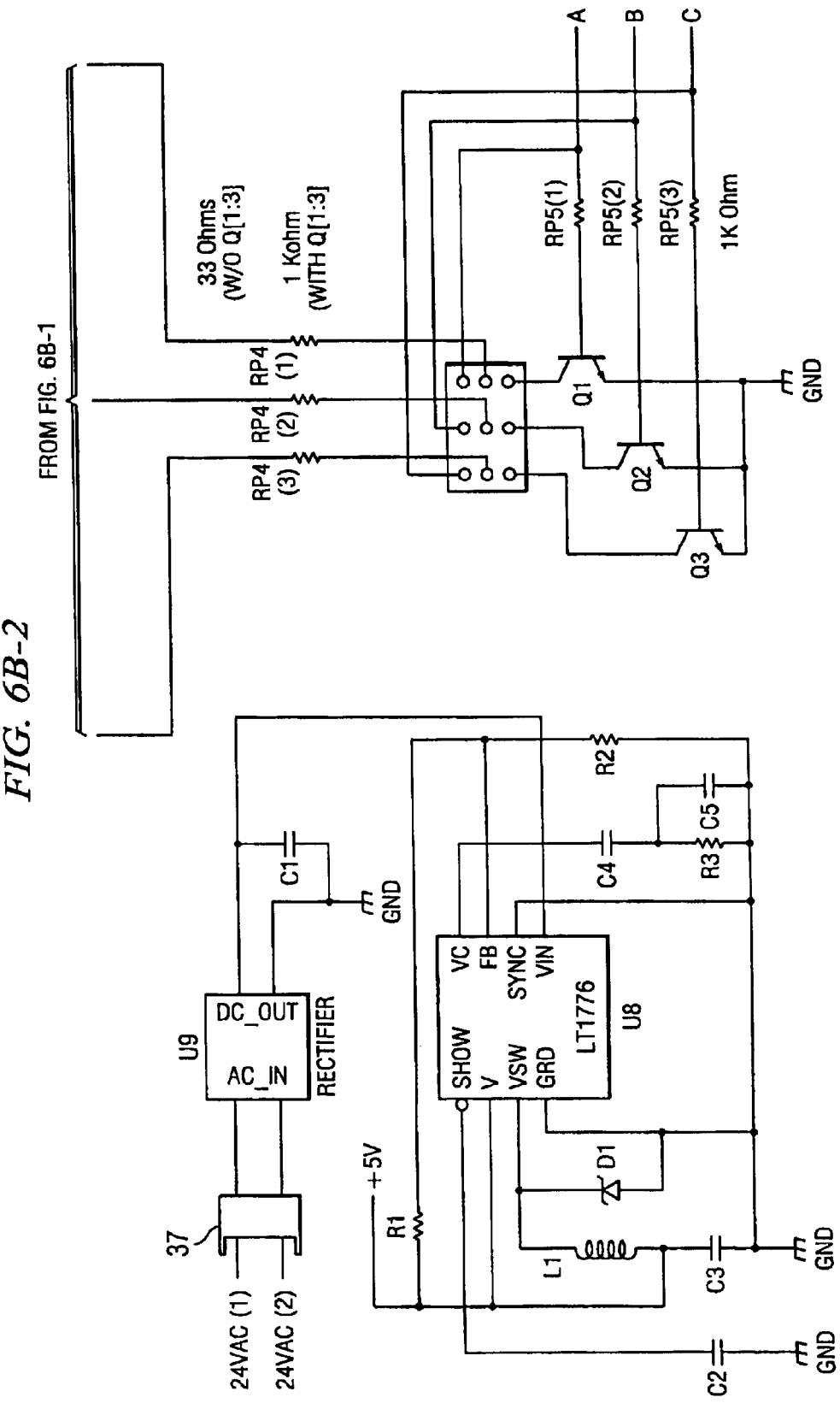

FIGS. 6a and 6b are the wiring diagrams for the electronic controller with match lines being at "A–B–C". Solenoid terminal 33, remote relay terminal 56, controller power terminal 37 are displayed on FIG. 6b. The reader will note that the remote relay terminal is interlocked with the solenoid terminal. This enables the usage of the electronic controller as a controller for three solenoids rather than the preferred two solenoids and a remotely located electrical relay in the event that building criteria mandates such. Controller power terminal is displayed as two separate terminals but in actuality is a single four pin polarized terminal. FIG. 6a displays the remaining terminals positioned on the electronic controller. Those are the "EMS" terminal 57, fire alarm terminal 58, reset terminal 39 and door panel terminal 35. Adjacent to terminal 57 is "EMS Active". This jumper enables the Electronic Controller to function without a "EMS" signal by reversing 5+ VDC to 5-VDC. The Panic_Out Active serves the same function by permitting an active low signal rather than active high to be sent to the fire alarm when the panic button is pressed. Reference Alphanumerics denote the primary components of the circuit board.

Figure 6C:
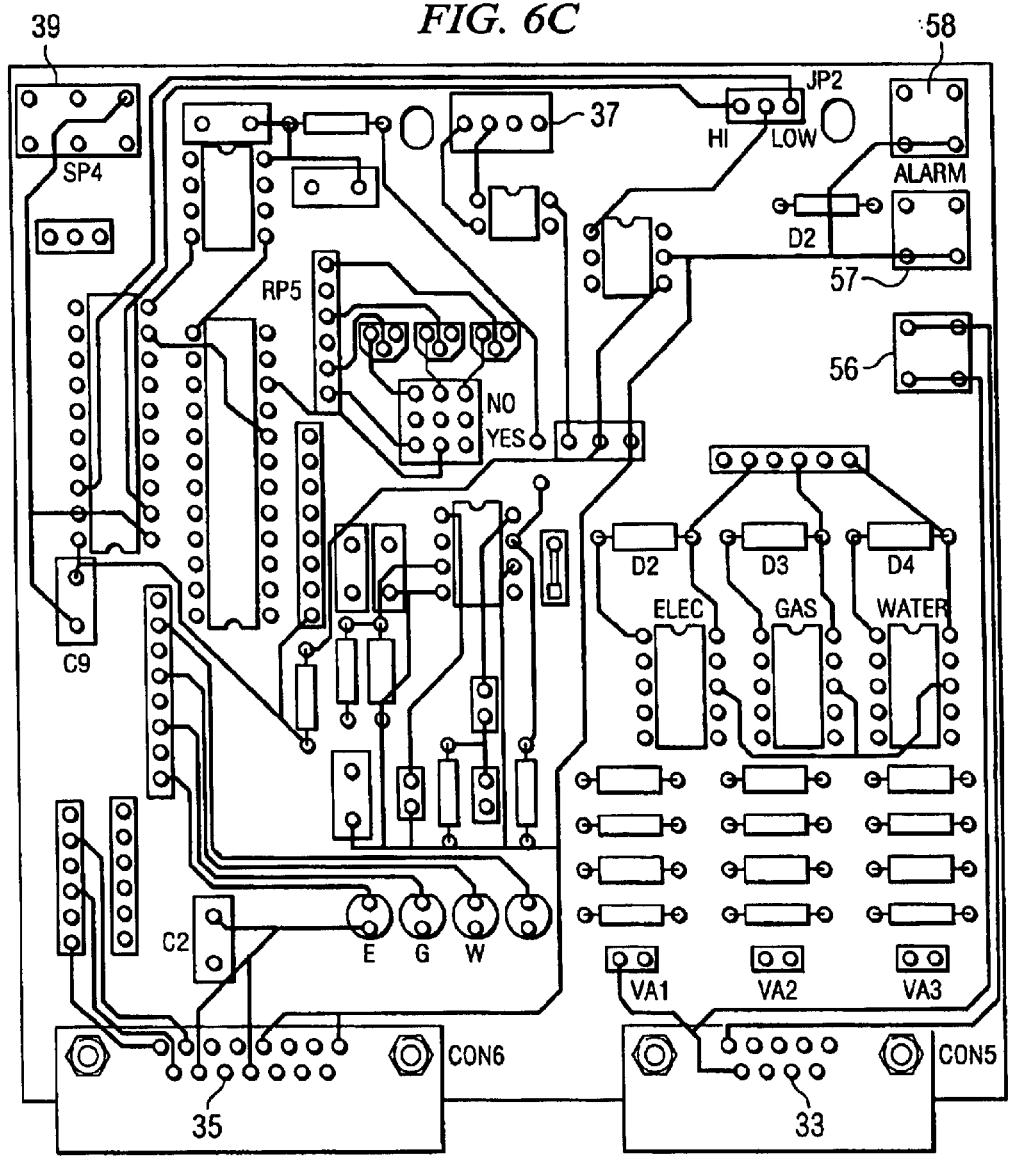

FIG. 6c is a view of the printed circuit board of the electronic controller. All terminals referenced on FIG. 6a and FIG. 6b are numbered respectively.

Figure 6D:
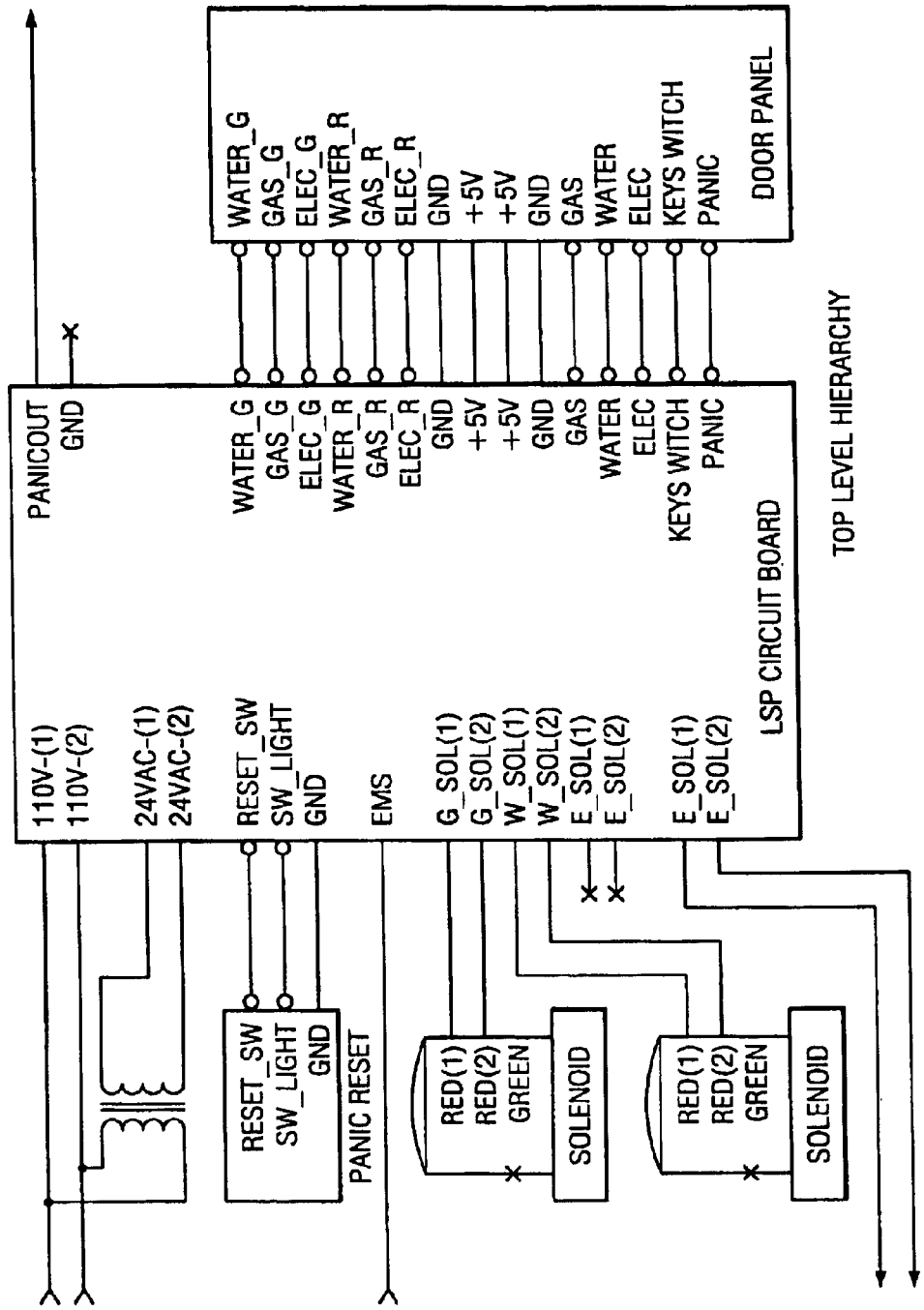
Figure 6E:
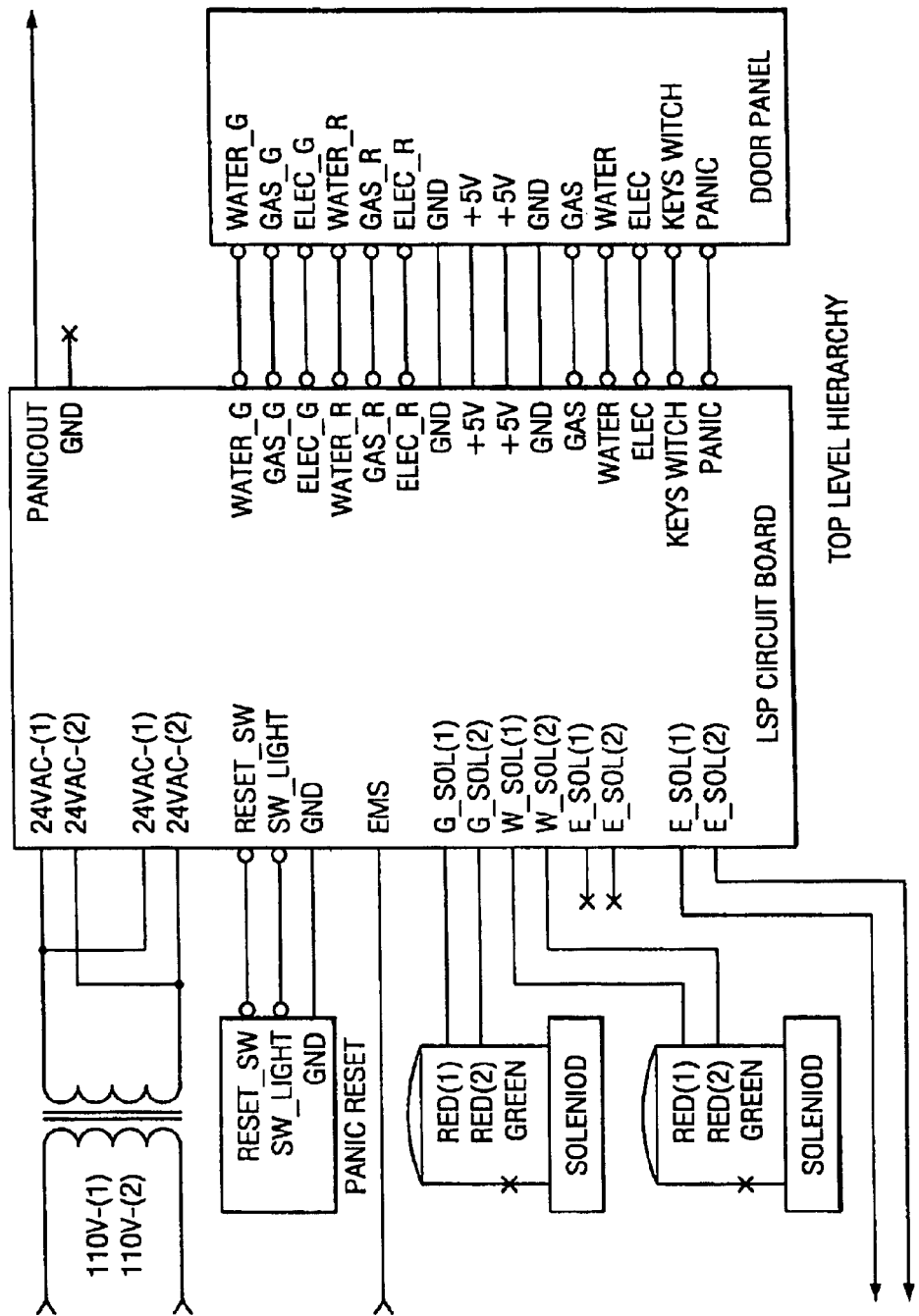

FIG. 6d is a diagram of the TOP LEVEL HIERARCHY of the electronic controller when 110 VAC is used to activate the solenoids and electrical relay;

FIG. 6e is a diagram of the TOP LEVEL HIERARCHY of the electronic controller when 24 VAC is used to activate the solenoids and electrical relay.

Figure 7:
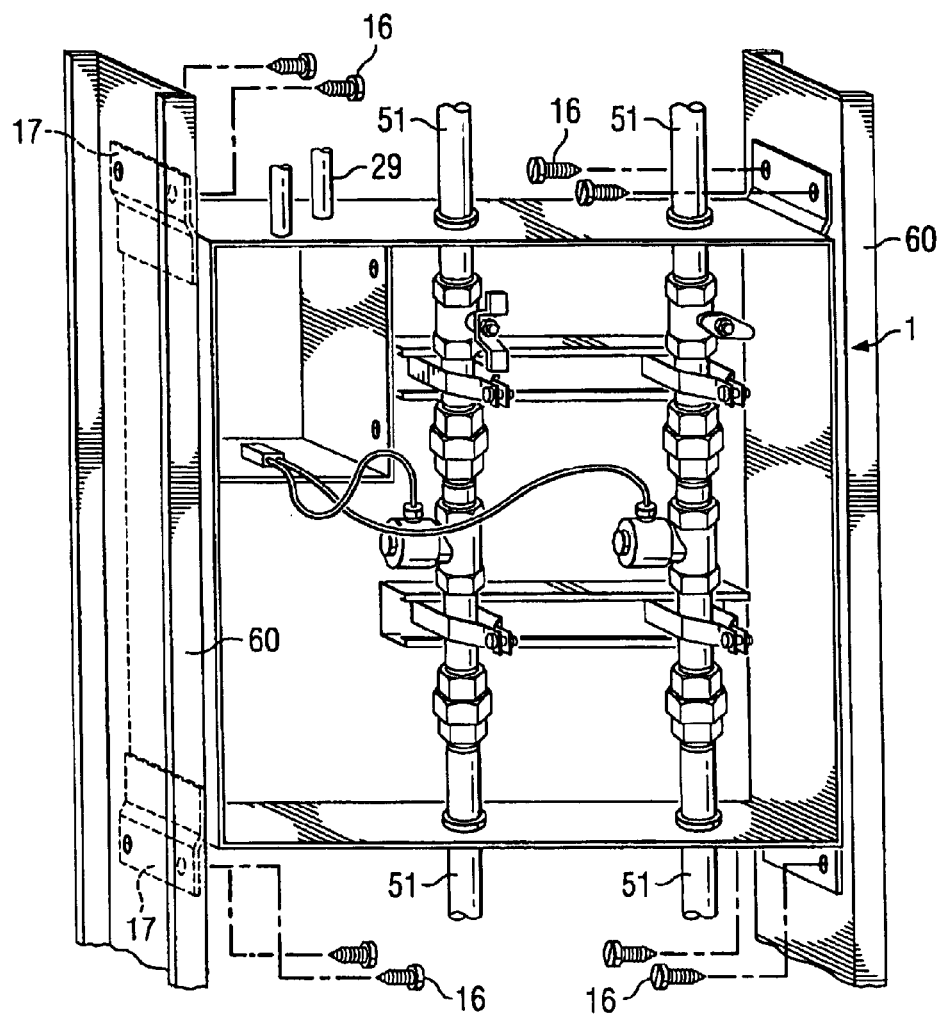
FIG. 7 and FIG. 7a show the Service Panel during the various stages of construction and assembly.
Figure 7A:
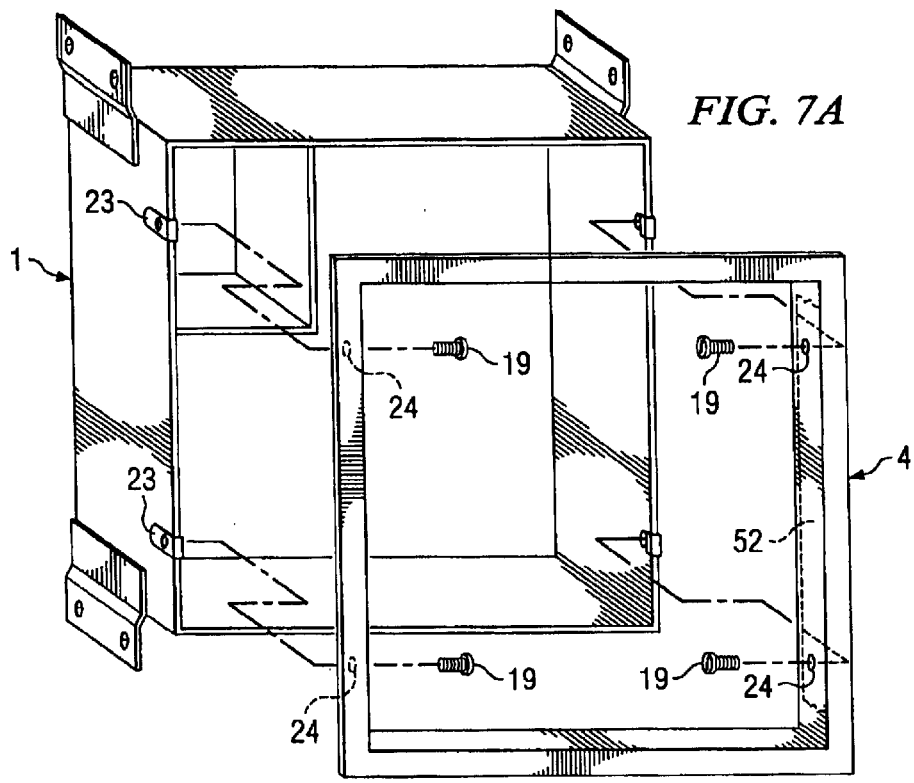

FIG. 7 and FIG. 7a illustrate the stages of installation of the Service Panel. FIG. 7 shows the technique for the mounting of Service Panel 1 to the metal wall framing studs 60 during the rough-in phase of construction. Sheet metal screws 16 are inserted through the holes in mounting bracket 17 at either side of the Service Panel and screwed into the studs. Electrical conduit 29 are field installed at the top of the Service Panel. Service piping 51 are connected to their respective cut-off assembly 2 and/or 3.

FIG. 7a demonstrates how door panel assembly 4 is mounted onto Service Panel 1. Machine screws 19 are inserted through mounting holes 24 and tightened into retaining clips 23 located at either side of the Service Panel.

ADDITIONAL EMBODIMENTS

Figure 8:
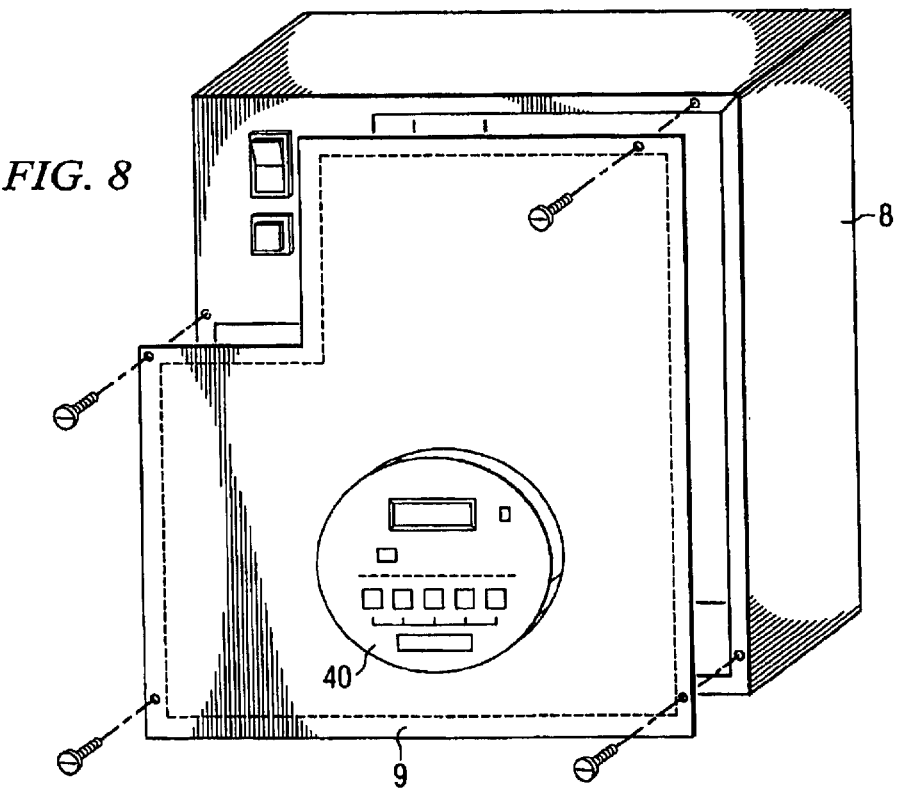
FIG. 8 shows the use of an optional conventional digital timer to regulate times of permissible operation of the Service Panel.
Figure 8A:
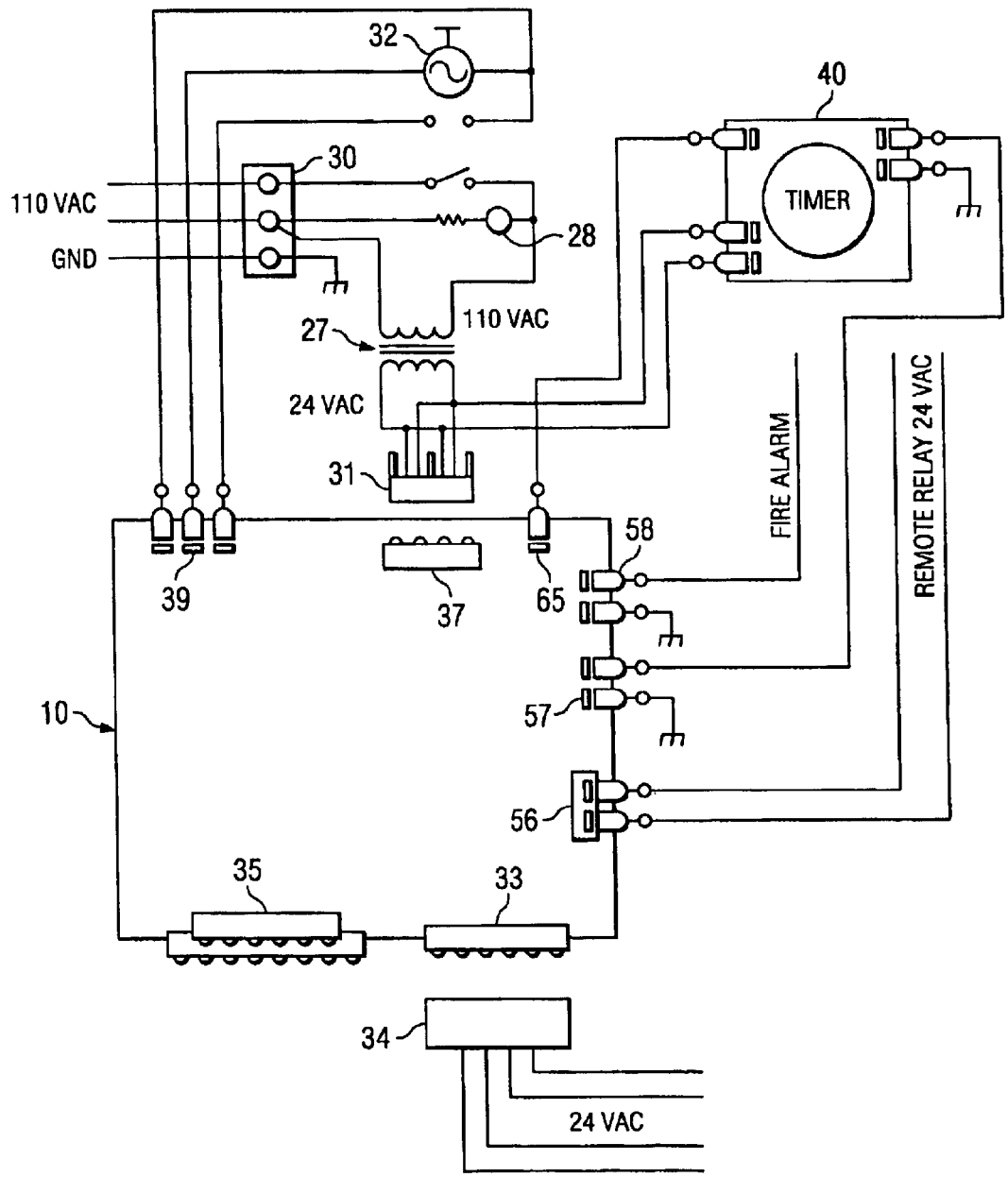
FIG. 8a displays the wiring diagram when the digital timer is utilized.

There are instances where a school building or facility does not have "EMS". In those cases and as illustrated in FIG. 8, an optional conventional digital timer 40 is mounted upon the secondary door 9. This timer will activate and de-activate the Service Panel and Utility Controller at the programmed time intervals. Because this timer is located within the Service Panel at Utility Controller 8, unauthorized times of activation cannot be programmed. FIG. 8a illustrates the wiring for this optional conventional timer. Alternative DC power terminal 65 provides a DC signal that can be routed through the digital timer. When the timer determines a permissible operation time then the DC signal is sent through "EMS" terminal 57 thereby activating the electronic controller.

ALTERNATIVE EMBODIMENTS.

Figure 9:
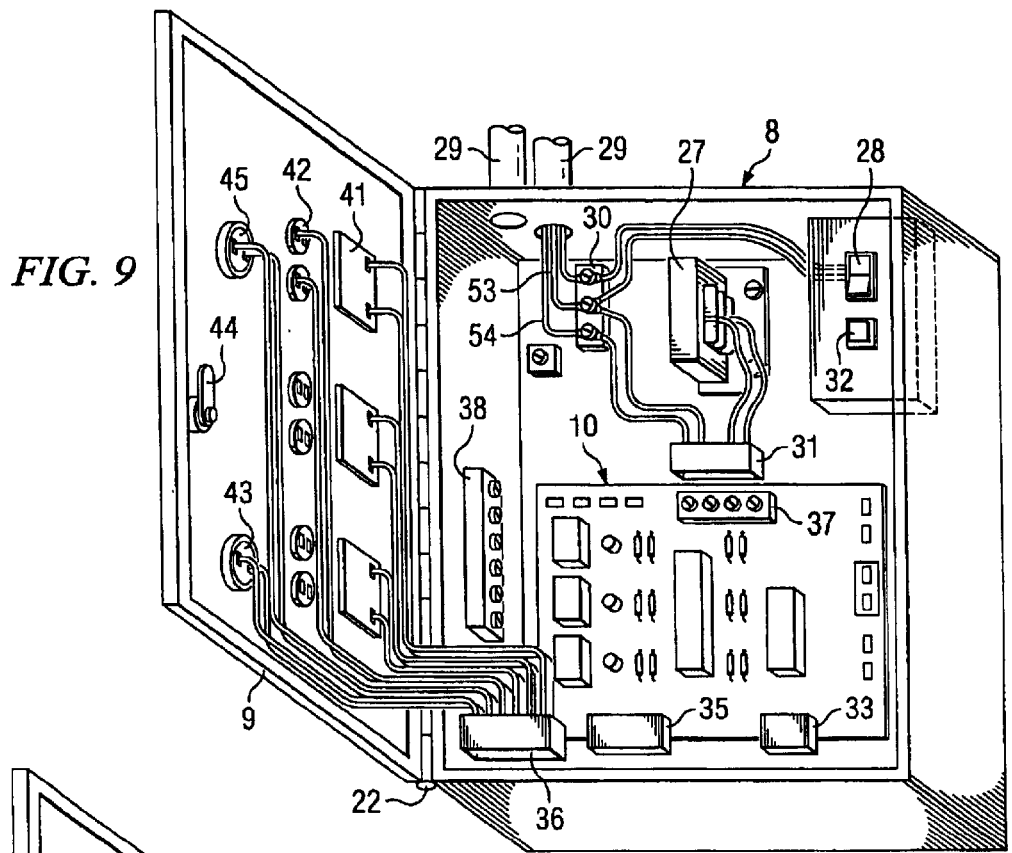
FIGS. 9 and 9a detail the Utility Controller when mounted remotely from the Service Panel along with the respective wiring diagram.

There are various possibilities with regard to the many uses of our Service Panel and Utility Controller. The Utility Controller can be mounted remotely from the Service Panel. FIG. 9 demonstrates such a remote positioning. In this configuration, secondary door 9 is affixed to Utility Controller 8 with a continuous hinge 22. Line voltage wiring 53 and ground wire 54 enters the box through electrical conduit 29 and connected to power terminal 30. In this configuration, the power source for the solenoids and remote electrical relay is 110 volts A/C. Power plug 31 provides the 110 volt current as well as the low voltage power to the electronic controller at power plug 31. Which in turn is inserted at controller power terminal 37. Solenoid terminal 33 and door panel terminal 35 are positioned vertically from electronic controller 10. Unlike previous illustrations, this alternate positioning of these terminals permits ease in connecting door panel plug 36. Control switches 41 and Indicators (LED) 42 along with keyed switch 45 and panic button assembly 43 are positioned on secondary door 9. The Utility Controller is secured by means of keyed lock 44. Though not shown, solenoid plug 34 is connected to secondary terminal 38. From this terminal, field wiring is extended through electrical conduit 29 to the service panel. Combination switch/circuit breaker 28 and reset switch 32 along with low voltage transformer 27 are positioned within the Utility Controller. A grounding lug is used to ground the box.

Figure 9A:
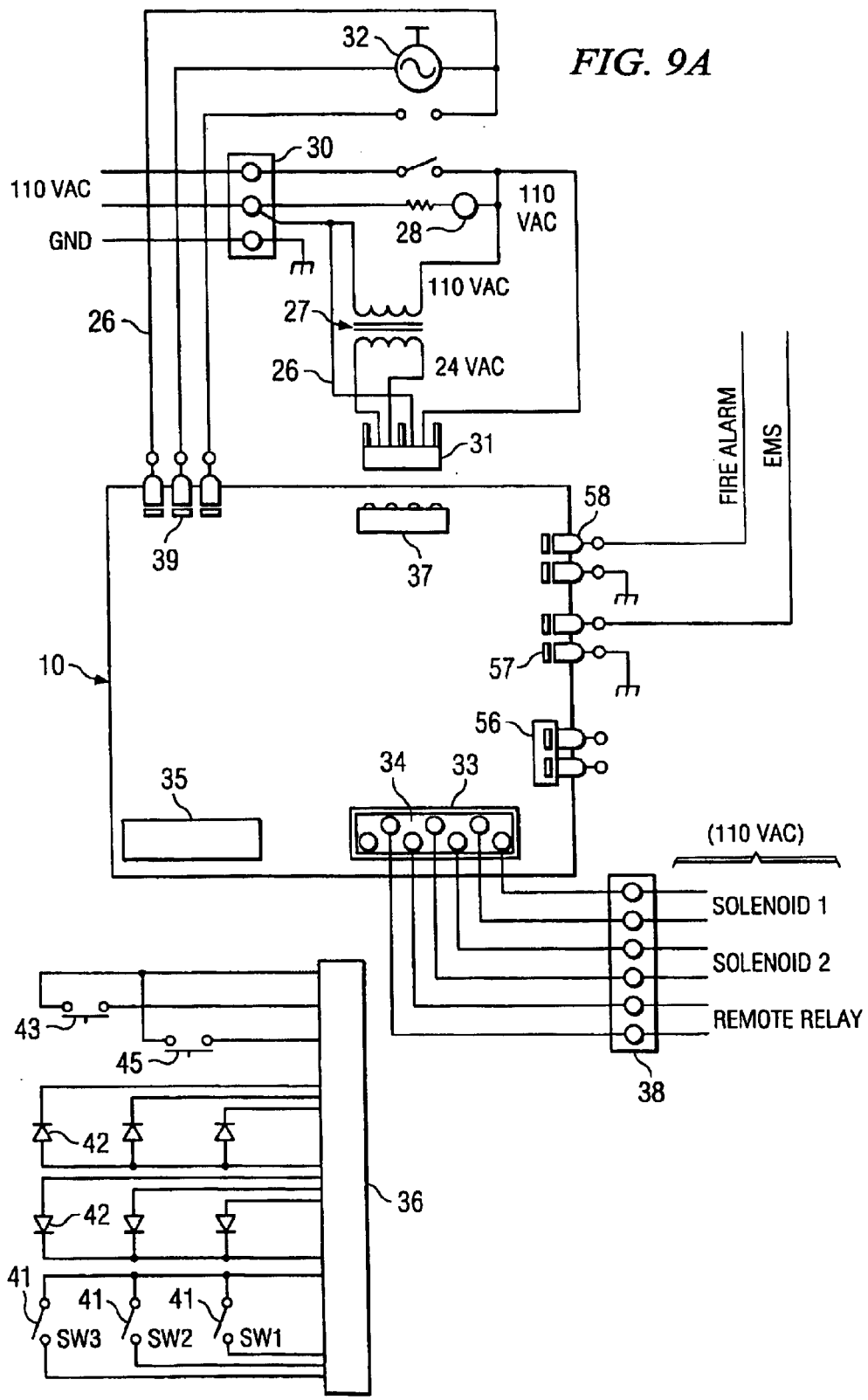

FIG. 9a is the wiring diagram for this alternate configuration and explains in detail this alternate means of utilizing the Utility Controller. As shown, remote relay terminal 56 is not used in this instance. Rather, power to control a remote relay is obtained through solenoid terminal 33. Solenoid plug 34 extends all control wires to secondary terminal 38 for field connection to the remotely located electrical relay and solenoids. Door panel plug 36 receives wiring from the three control switches 41, the six indicators (LED) 42 as well as panic button assembly 43 and keyed switch 45. When inserted into door panel terminal 35, these switches and lights will be interfaced with the electronic controller 1.

Figure 10:
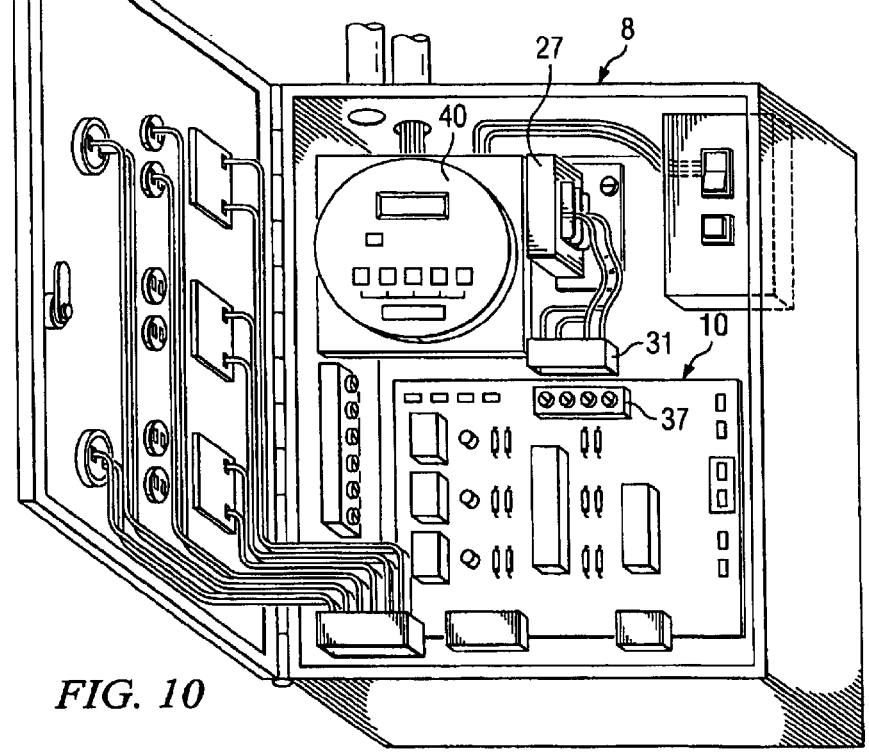
FIG. 10 shows the remotely mounted Utility Controller with the addition of the digital timer.

An optional conventional digital timer can likewise be used to regulate and control times of activation when the Utility Controller is located remotely from the Service Panel. FIG. 10 illustrates the positioning of the conventional digital timer 40 within Utility Controller 8. This figure demonstrates the power source for the solenoids and remote electrical relay being provided at power plug 31 by the low voltage transformer 27. This plug likewise is connected to electronic controller 10 at controller power terminal 37.

Figure 10A:
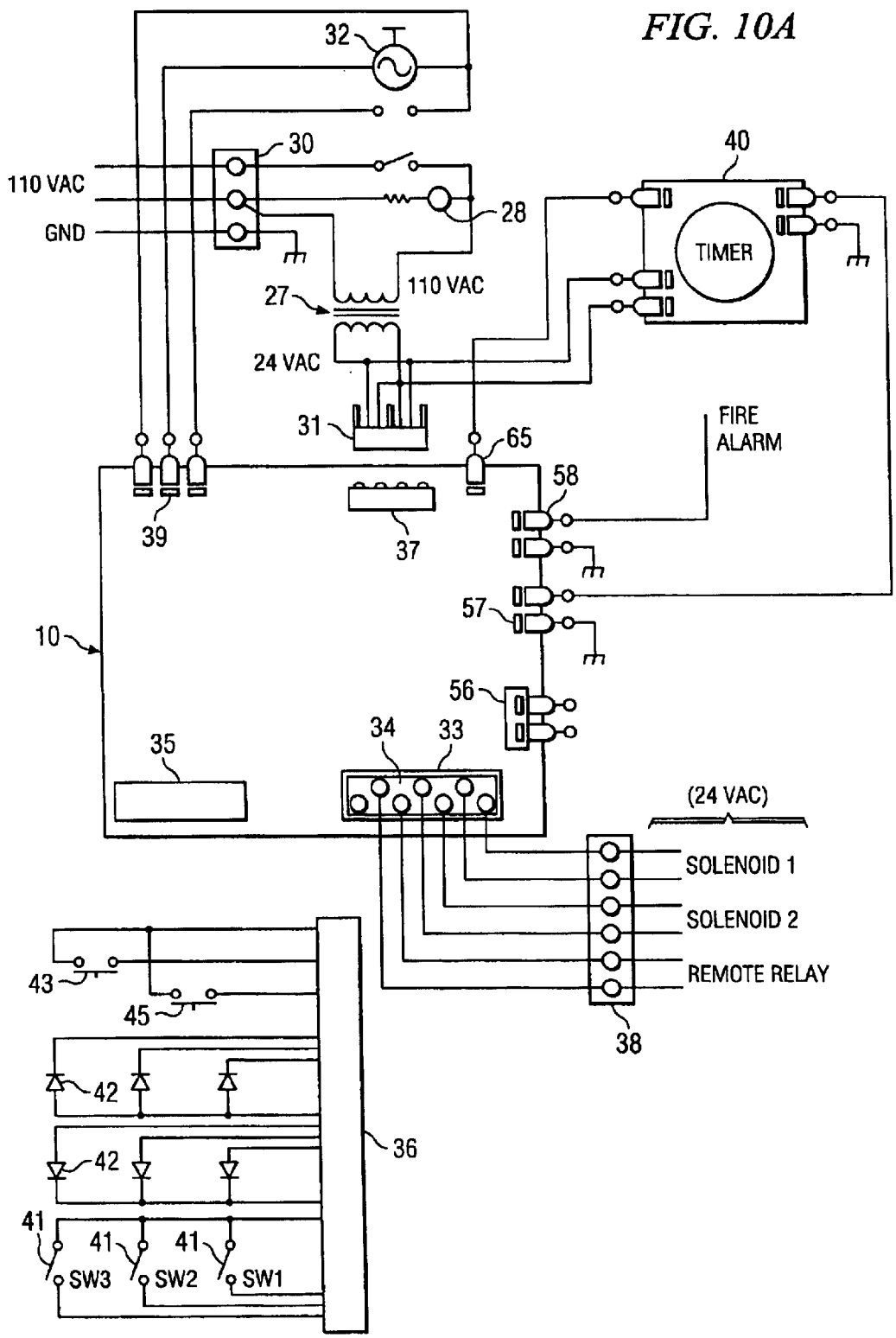
FIGS. 10a through 10c show the various methods whereby the digital timer will regulate the permissible operation times.

FIG. 10a is the wiring diagram for this alternate configuration. As detailed in prior figures, the digital timers provides a DC signal to the "EMS" terminal 57 during permitted time intervals. The timer is powered by 24 VAC.

Figure 10B:
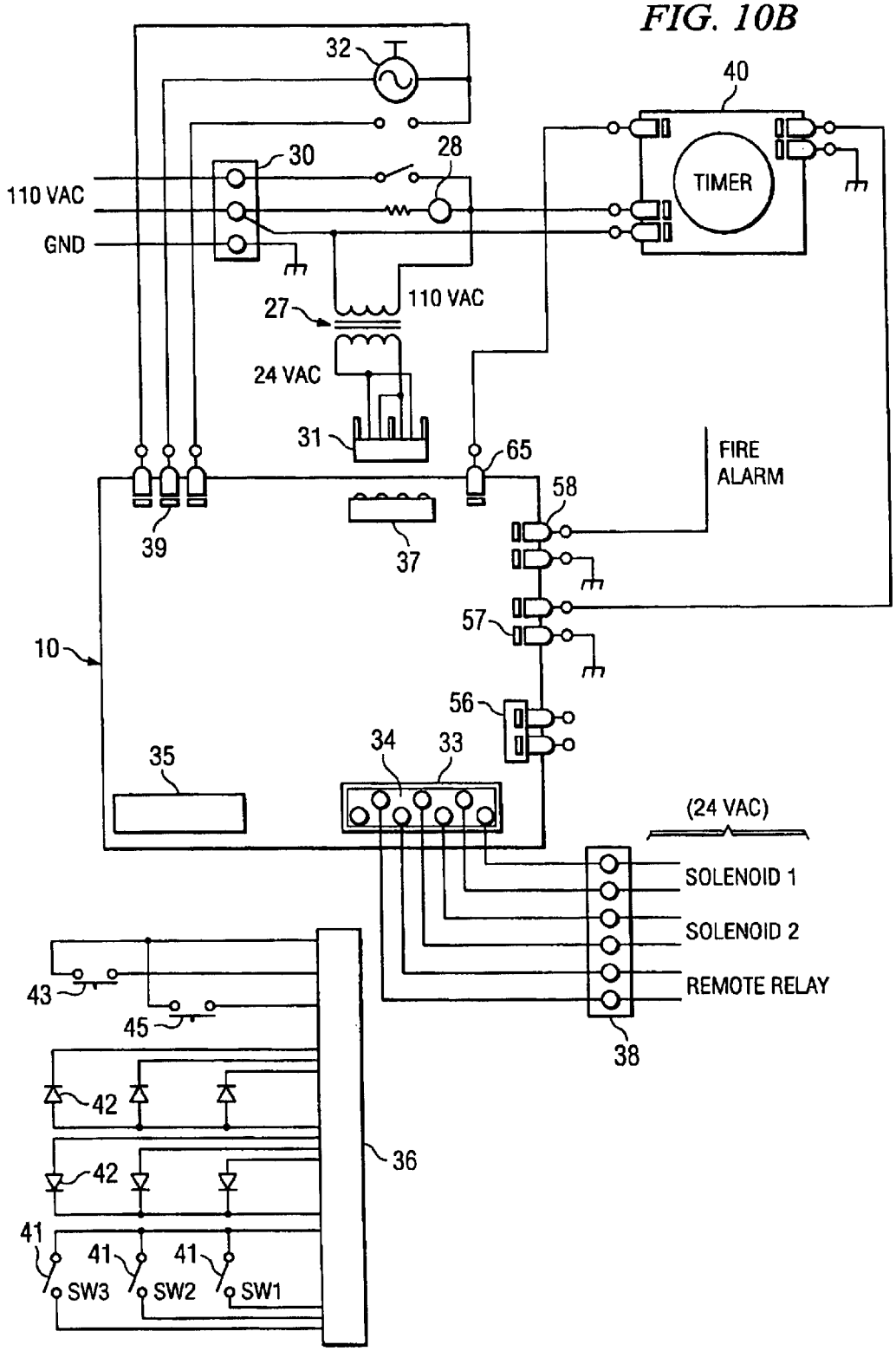

FIG. 10b is similar to FIG. 10a except that in this instance the timer is powered by 110 VAC.

Figure 10C:
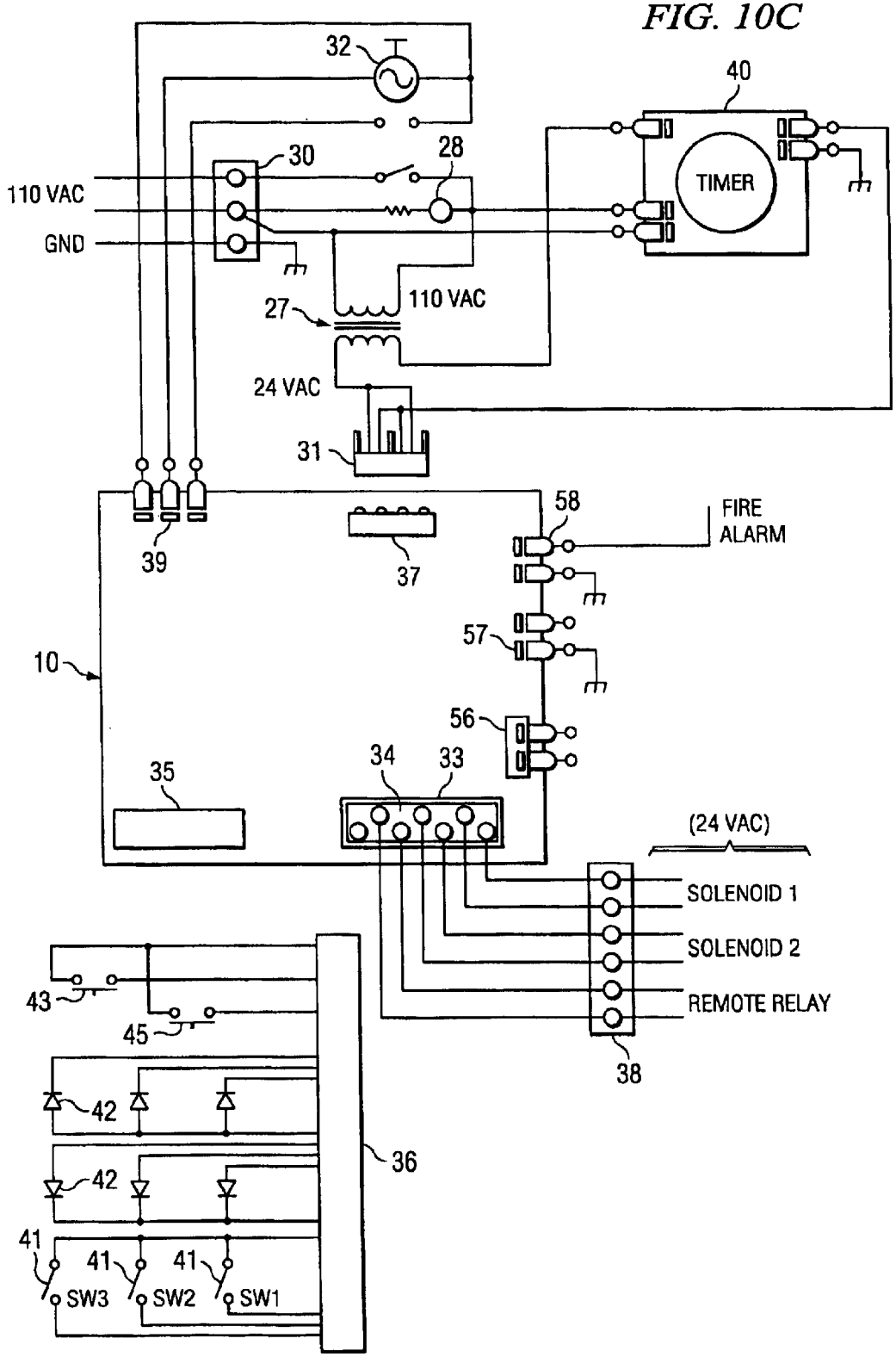

FIG. 10c likewise is similar to the two previous figures. However, in this instance, the timer is powered by 110 VAC but does not receive a DC signal from the electronic controller. The timer merely controls the electronic controller by denying the low voltage current to operate thereby disabling the controller and services during no permitted time intervals. When this method of controlling the controller is utilized, the second set of Indicators (LED)'s would not function as intended to notify the user in the event that a service was left active when a scheduled shut down occurred.

Figure 11:
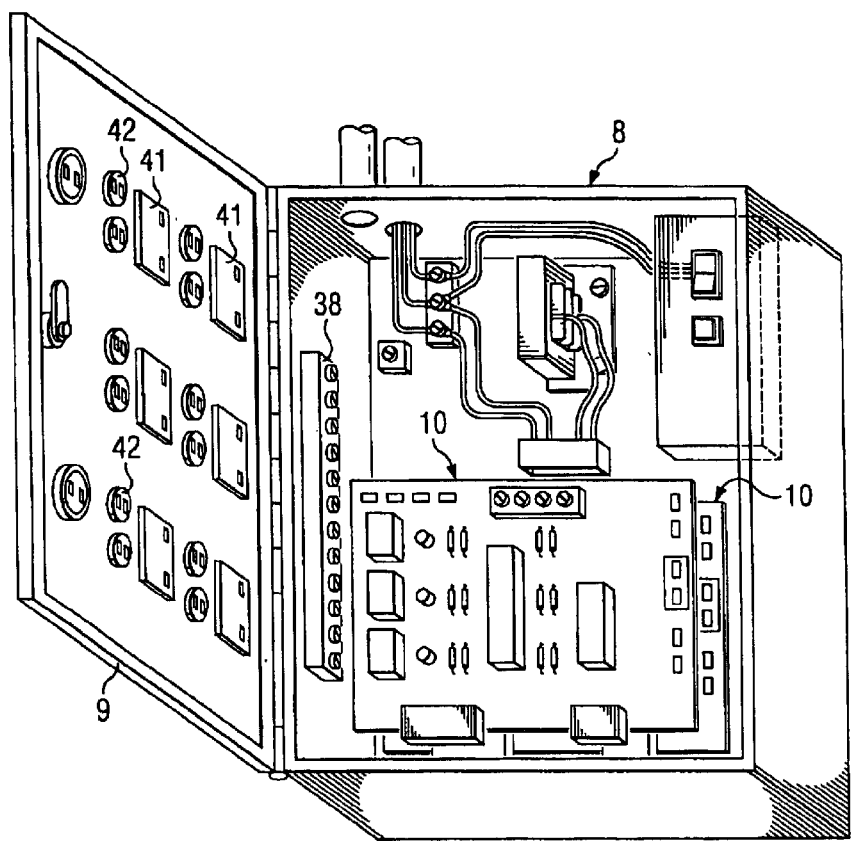
FIGS. 11 through 11c show the remotely mounted Utility Controller with more than one electronic controller mounted within.

As illustrated in FIG. 11, more than one electronic controller 10 is positioned within the same Utility Controller 8. Sufficient control switches 41 and Indicators (LED) 42 are positioned on secondary door 9 so as to permit the individual control of each controlled services. In this alternate embodiment, secondary terminal 38 contains sufficient Connection points for the number of services controlled. With the exception of the added number of electronic controllers and required control switches, all other components are similarly shown in FIG. 9.

Figure 11A:
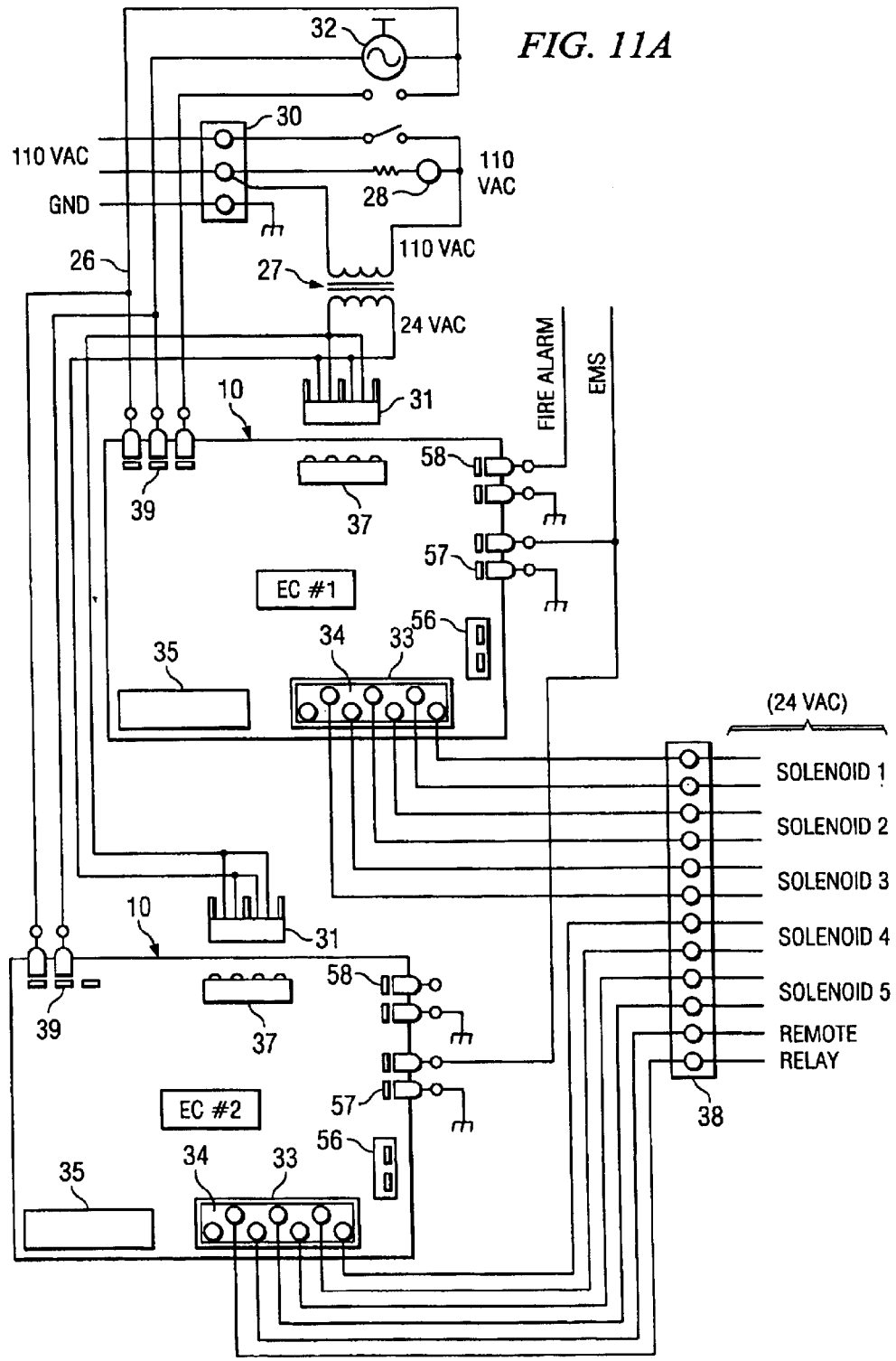

FIG. 11a is the wiring diagram for this alternate configuration. The reader can see that this configuration has two electronic controllers "EC #1" and "EC #2". Power to the controllers is provided through power plug 31 to each controller power terminal 37. Output current to activate the remote solenoids and electrical relays are gathered at secondary terminal from each respective solenoid plug 34. These wires provide low voltage control current to solenoids within a remotely mounted service panel. This control wiring is field installed. Reset terminals 39 are parallel wired to reset switch 32 with only one controller providing the DC signal needed to illuminate the LED. "EMS" wiring along with fire alarm wiring is connected to each controller. Remote relay terminals 56 are not utilized.

Figure 11B:
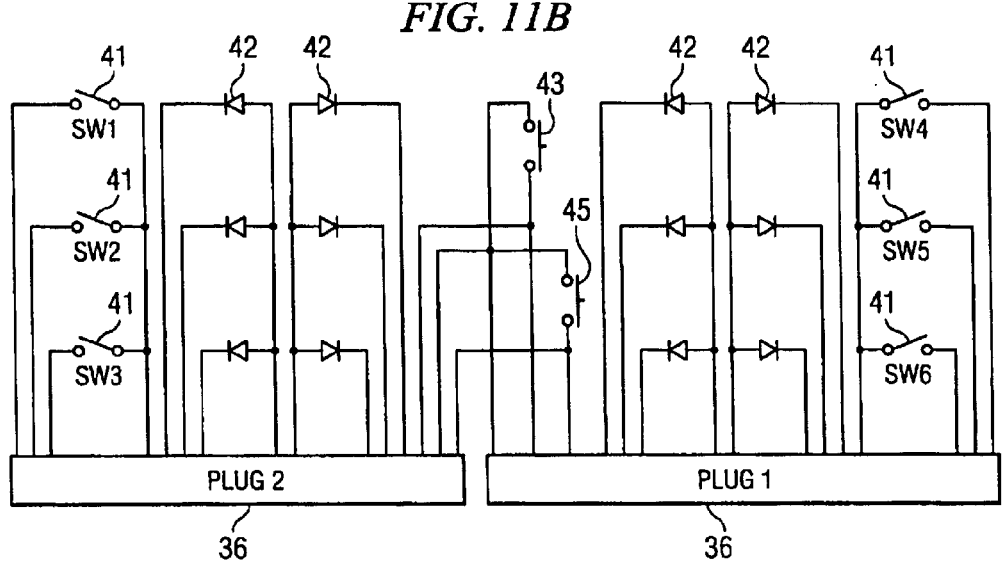

FIG. 11b is the wiring diagram for the secondary door. Each controller will be interconnected to the respective control switches 41 and Indicators (LED) 42 with the respective door panel plug 36. Keyed switch 45 and panic button assembly 43 are wired parallel to each door panel plug.

Figure 11C:
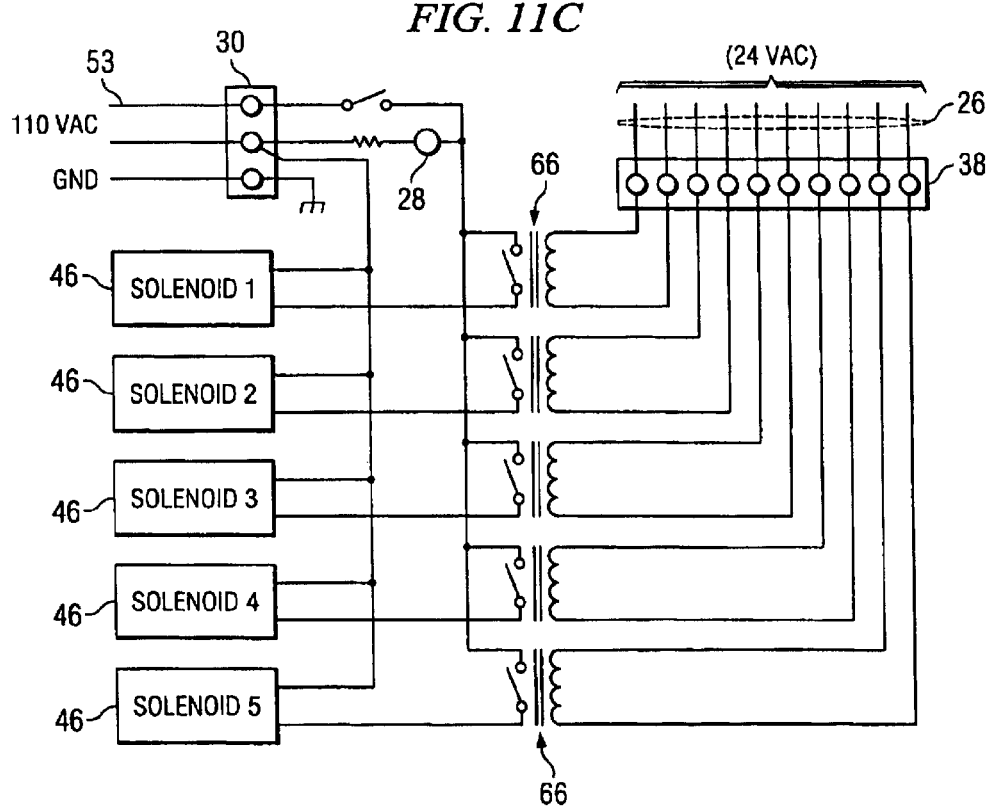

FIG. 11c demonstrates how low voltage wiring provided by the remotely mounted Utility Controller is connected to solenoids 46 within the Service Panel. These low voltage wires are field connected to a secondary terminal 38. From there connections are extended to a series of remote relays 66. These relays are normally open, single pole relays having a 24 VAC coil. Energizing the relay activates the respective 110 VAC solenoid 46. Similar to Utility Controller wiring, field installed line voltage wiring 53 as well as a grounding wire 54 are connected to power terminal 30. Combination switch/circuit breaker 28 provides the ON/OFF electric capability for the service panel power.

Figure 12:
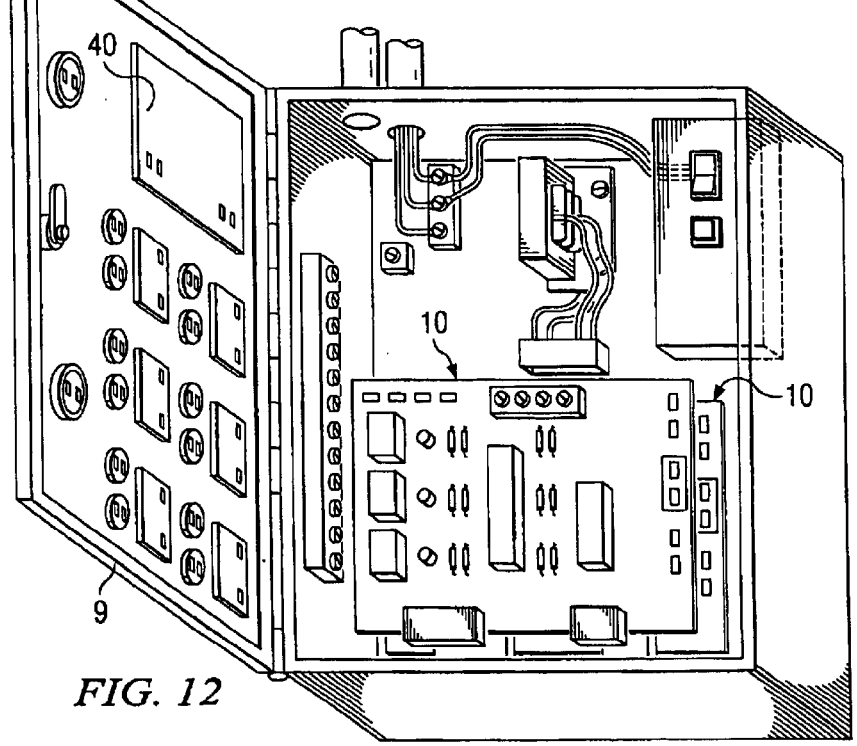
FIGS. 12 and 12a show the remotely mounted Utility Controller with the digital timer added.

FIG. 12 illustrates another embodiment of the invention. Though similar to that shown in FIG. 11, an optional conventional digital timer 40 is place on the secondary door 9.

Figure 12A:
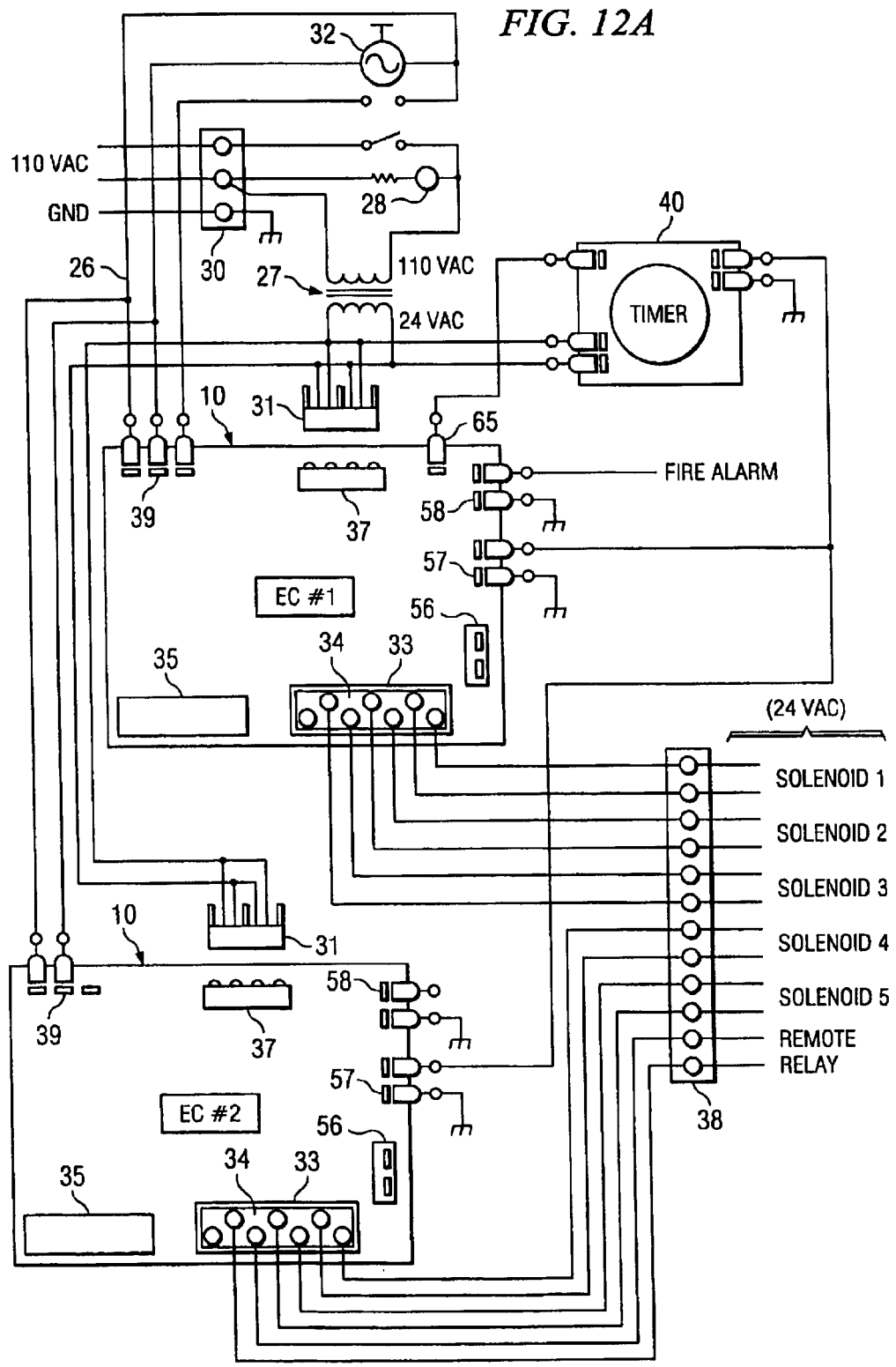

FIG. 12a is the wiring diagram for this alternate configuration. The conventional digital timer 40 utilizes DC current originating from alternative DC power terminal 65 to service as the "EMS" signal.

Figure 13:
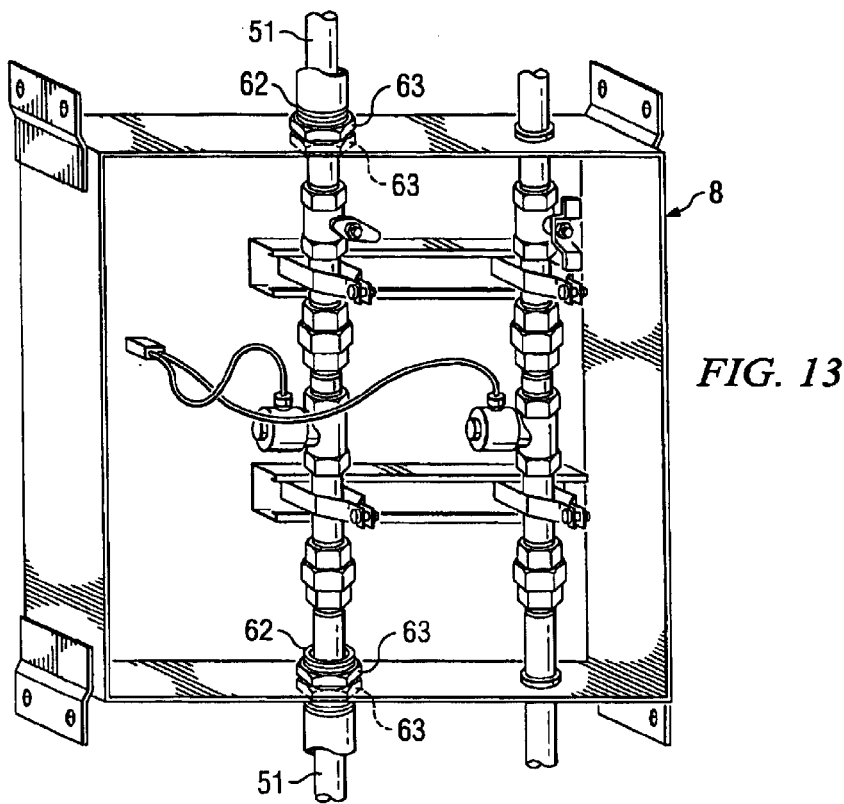
FIG. 13 shows a variation of the Service Panel with the Utility Controller mounted remotely.
Figure 14:
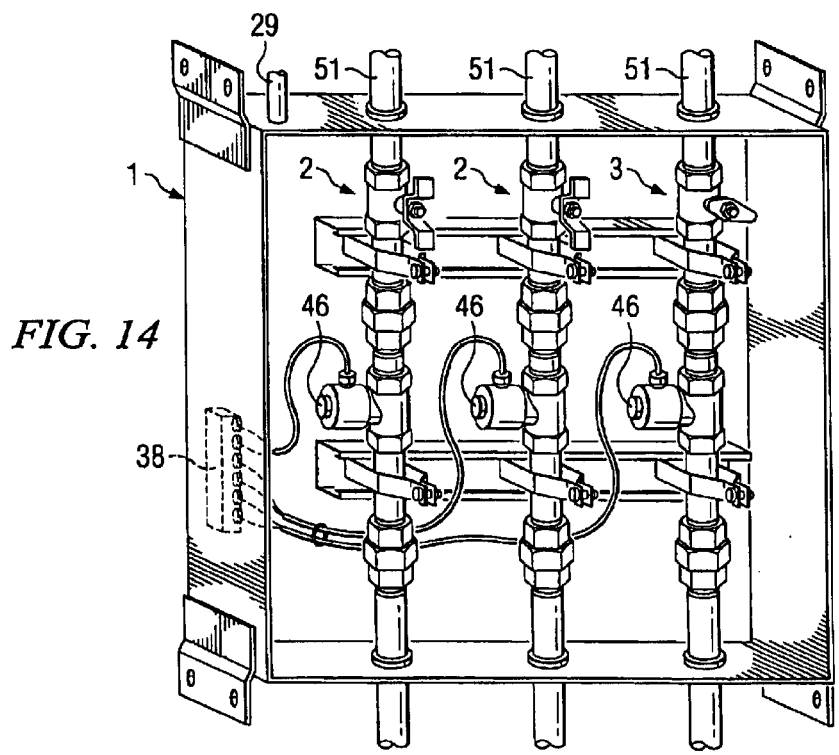
FIG. 14 shows this same variation but with three cut-off assemblies within the Service Panel.
Figure 15:
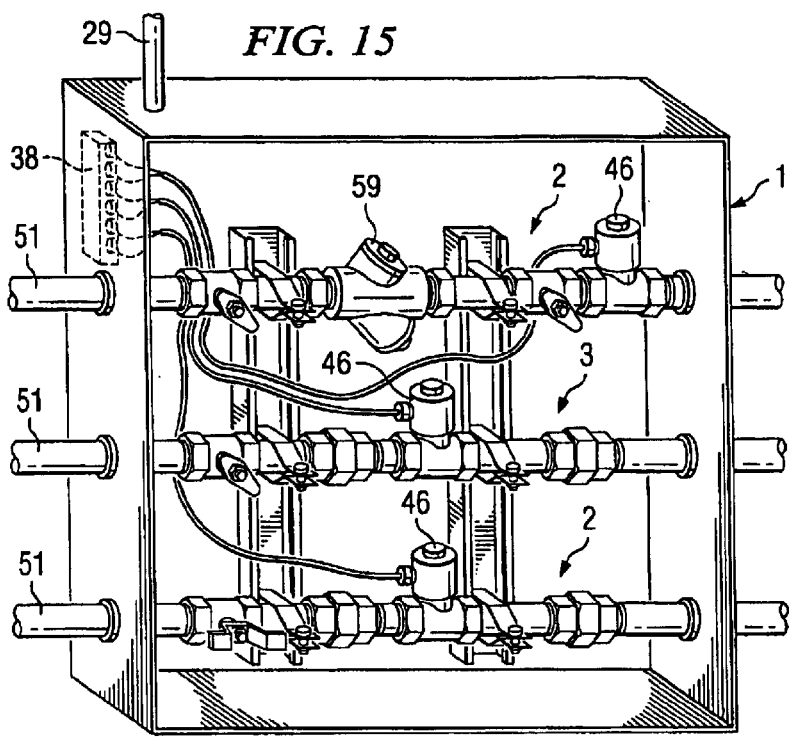
FIG. 15 is another alternative method of utilizing the Service Panel as a master control service panel.

FIGS. 13–15 are referred to in the section below titled "Conclusions and Ramifications of the Invention".

Figure 16:
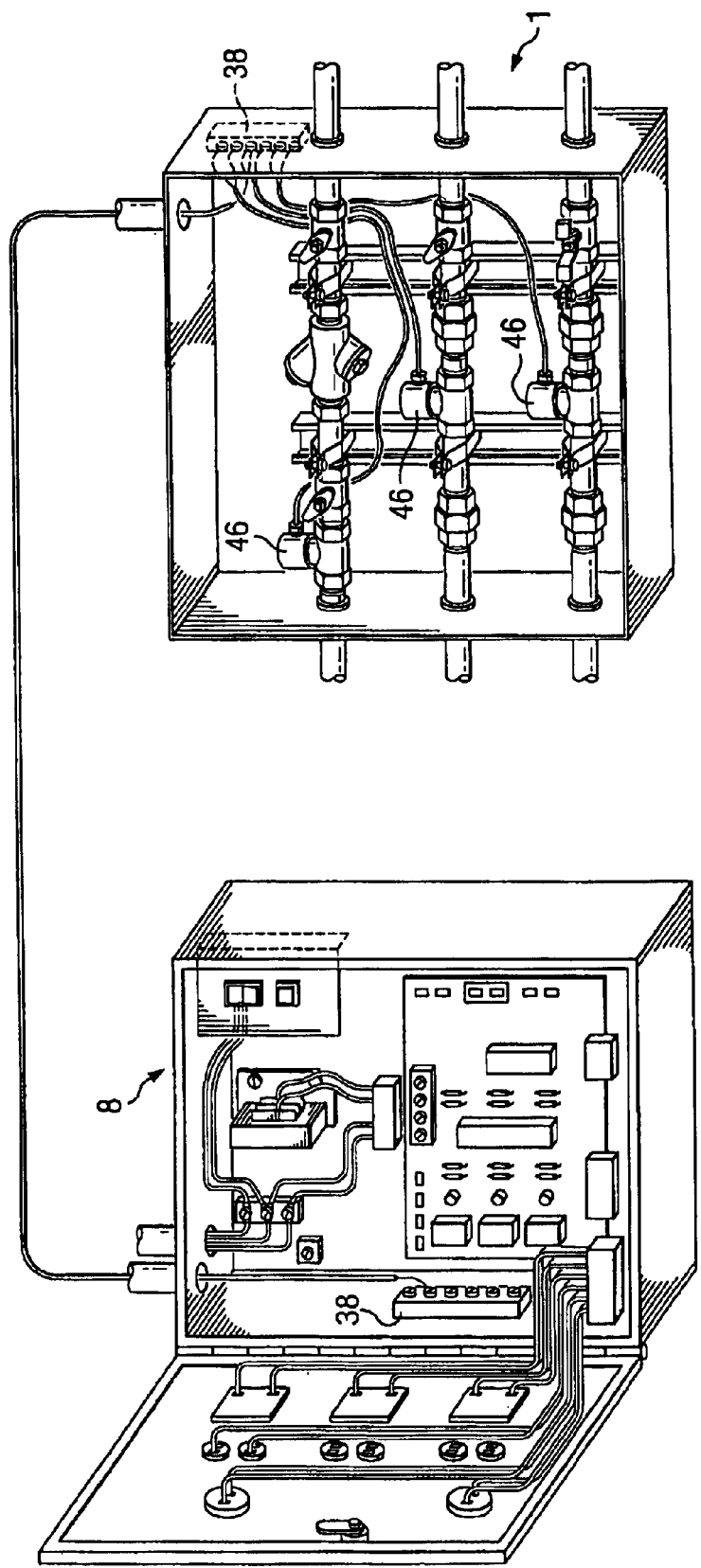
FIG. 16 displays the wiring technique for the Service Panel with the Utility Controller being mounted remotely.

FIG. 16 demonstrates the basic wiring and panel configuration when Utility Controller 8 is mounted remotely from the service panel 1. In this illustration line voltage control wiring originates at secondary terminal 38 within the Utility Controller and is field installed by craftsmen from it to the service panel and terminated at secondary terminal 38. Solenoids 46 are wired to the corresponding terminal post. Though not shown for clarity, a door panel assembly 4 is mounted onto the service panel to conceal the interior apparatus.

Figure 17:
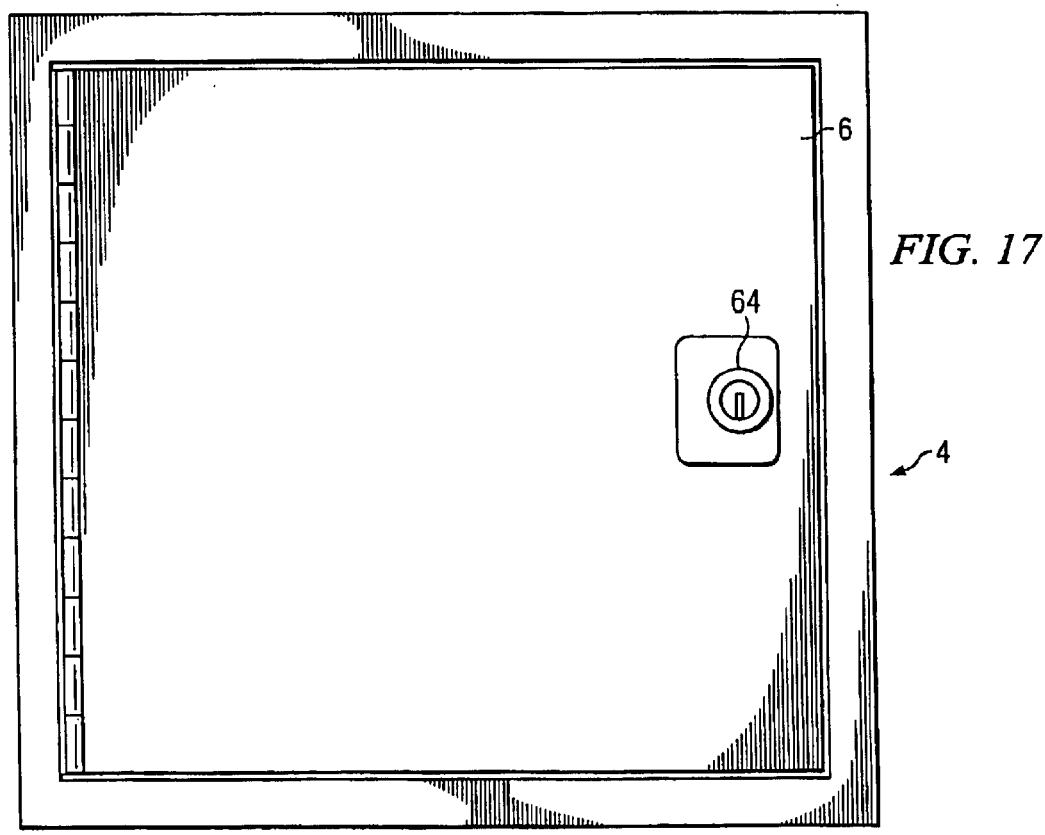
FIG. 17 is an alternate view of the door panel assembly when the Utility Controller is mounted remotely.

FIG. 17 illustrates a modified door panel assembly 4 used when the Utility Controller 8 is remotely mounted from the Service Panel 1. Door lever with lock 64 permits the door panel 6 to be locked and secured while permitting ease in opening the door when unlocked. The door lever with lock is of common construction intended for such purposes.

FIG. 18 illustrates a modified secondary door 9 used with Utility Controller 8 when building criteria dictates that there be a finished wall edge at the secondary door. Similar to door panel assembly 4, this modified secondary door has a door frame with outer flange and mounting holes 24. Retaining clips 23 are positioned over mounting holes located on the Utility Controller. The secondary door assembly is then secured with machine screws 19. A continuous hinge 22 attaches the door to the frame and a keyed lock 44 secures it in place.

ADVANTAGES

From the description, the reader will see the many advantages of our invention.

A) It is a very practical apparatus that will provide the means to control the various services typically needed in a science classroom.

B) It prevents unregulated use of the controlled services.

C) It prevents unauthorized entry to the secured compartment.

D) It will automatically disengage during non-scheduled periods.

E) It will sound an alarm in case of emergency.

F) Although a person of authority must activate a service, it permits persons without that authority to deactivate the service.

G) It will indicate an improper shutdown of controlled utility services if the "EMS" shuts down the Utility Controller while a switch is in the active state.

OPERATION

The manner of installing and operating the Service Panel with Utility Controller is unique to previous applied methods and apparatuses.

As illustrated in FIG. 7, the Service Panel is mounted in the wall cavity during the rough-in phase of construction. This permits the connection of each service pipe to the cut-off assemblies. The line voltage wiring is also installed with required conduit during this phase. However, no other electrical or finished components are installed.

FIG. 7a shows the final step to complete the assembly of the Service Panel. Once the field electrical connections are made within Utility Controller 8, the Utility Controller can be installed and then closed. Once door panel assembly 4 is mounted onto the Service Panel the final wiring connections are made by inserting the door panel plug 36 into the door panel terminal 35. The combination switch/circuit breaker is turned to the ON position, then the panel is locked.

As illustrated in FIGS. 4b and 4c, respectively, either low voltage wiring 26 or line voltage wiring 53 is connected to the electronic controller 10. These wires extend through field installed electrical conduit 29 to a field installed junction box located in the ceiling space above the laboratory service panel. From this point the electrician would extend the wiring to an electrical relay that he provides and mounts in a separate service panel. This remote electrical relay will control the various electrical outlets within the science classroom. Also, "EMS" wiring is extended through conduit to the "EMS". Likewise, wiring is extended to the building fire alarm system.

Once installation and assembly are completed, the Service Panel with Utility Controller is ready to be placed in service.

To activate the individual services that are controlled by the Service Panel and Utility controller, the "EMS" must first be in the active state. Once that is done, it is necessary that the keyed switch be turned to the ON position. At this point control switches become active and individual services can be energized.

The turning ON of these switches energizes a rely located on the electronic controller. This relay in turns energizes the service control mechanism in the case of the electrical service, this mechanism is a field installed electrical relay remotely located in a separate service panel.

The water and gas are activated by the solenoids located within the Control Panel. This design feature enables ease in maintenance and service to the systems because manual cut-off valves 49 and 47 as shown on. FIG. 2 are within the service panel. Further, because there is easy access to the cut-off valves, the plumbing services can be interrupted during extended periods of non-use of the school facility.

The Service Panel is secured from unauthorized entry by the keyed lock. Access is gained by unlocking and opening the door panel. Once opened, the combination switch/circuit breaker is turned OFF prior to any maintenance procedures.

Once the control switch energizes services, the momentary keyed switch returns to the OFF position and is removed without disrupting the active services. These services will remain active as long as the control switch remains in the ON position. Once a control switch is turned OFF then the service returns to the non-active state To re-energize the service, it is necessary to re-insert the key and again turn the switch to the ON position. This design feature prevents unregulated use of the individual services.

As before mentioned, the means by which the Utility Controller regulates the time intervals for the Service Panel to be active or inactive is by this inner connection to the "EMS". Since a conventional "EMS" will turn ON and OFF such equipment as heating and cooling air units or "HVAC", it is practical for the same signal sent to activate this equipment to likewise activate or in like deactivate the Service Panel and Utility Controller. The electronic controller is the means by which this becomes possible.

Also as shown in FIG. 6a, if the panic button assembly 43 is pressed, the controller will go to the "1111" state and requires it to be reset to the "0000" state before any services can be activated. This resetting is accomplished by the pressing of reset switch 32. Because this reset switch is located behind the door panel 6, it becomes necessary for authorized personnel to first unlock and open the panel door and then to press the reset switch.

CONCLUSIONS AND RAMIFICATIONS OF THE INVENTION

The reader will see that the invented Service Panel with Utility Controller provides a practical means of controlling the various services needed in a science classroom while providing a high level of security and safety for the students that occupy the classroom. Further, the presence of the panic button ensures that in the event of an emergency, an alarm can be sent and because the reset button is located within the secured service panel, any emergency will not go unnoticed. The advantages of this design becomes clear by following these two examples:

EXAMPLE 1

Suppose that while performing a science experiment, a student accidentally sets his note pad on fire. The panic button is pressed and the fire alarm sent. Clearly, it would be inappropriate for anyone other than someone of authority to determine that the condition that brought on the alarm no longer existed.

EXAMPLE 2

Now suppose that a student elects to be mischievous while the instructor is away from the classroom. The student presses the panic button and sends the alarm. It seems reasonable to assume that the administrator of the school would want to know from which classroom the false emergency originated. Because the students as well as the instructor are denied access to the interior of the Service Panel, then the guilty student is prevented from resetting the panel. Hence, this design feature serves as a deterrent to this form of mischief.

The "EMS" feature is an assurance that the Service Panel with Utility Controller can only be activated during pre-specified times. Typically, the "HVAC" in school buildings are monitored and controlled by a "EMS". These "HVAC" systems are activated just prior to the commencement of the school day and de-activated at the end. The same signal used to activate the "HVAC" likewise enables the Utility Controller. However, the Utility Controller has an added safety feature. "HVAC" should turn ON and OFF on command, The Utility Controller is designed to be activated only by demand. For instance, if one control switch on the door panel is left in the ON position at the end of the classroom day, a de-active signal from the "EMS" will de-activate the Utility Controller thereby de-activating the Service Panel. However, assuming that the next active interval is one hour prior to the commencement of classes, then the "HVAC" would be energized or become active. But the service that was left in the ON position would not likewise become active. This is due to the design of the source code of the electronic controller. As shown in FIG. 6, a de-active signal from the "EMS" returns the logic program to the "0000" state. In this state, it is necessary to re-energize the controller by inserting the key into the keyed switch and turning it to the ON position. In this described situation, the classroom instructor would learn that a control switch was left in the ON position because the lower Indicator would be illuminated.

There may be instances where a school building does not have a fire alarm system. Because the design of the electronic controller is such that this is permitted, the Service Panel with Utility Controller will function properly. All controlled services will be de-activated by the pressing of the panic button and the panel will require a reset before it becomes active. Only an alarm signal will not be sent.

Further, if desired by building design that the panic button assembly be omitted, then its absence will have no adverse affect in the operation of the Service Panel and Utility Controller. In such a case, the ability to deactivate the service panel by pressing a panic button will be denied. However in some instances, building design that a panic button assembly be field mounted in a remote location but still connected to the Service Panel necessitates it. This remotely located panic button when connected to corresponding pins at door panel plug 36 will readily be integrated into the system just as though it were an integral part of the Service Panel and Utility Controller.

Though the services described are the most commonly used services in school science classrooms, it should not be construed that the use of the invention be limiting in scope. For example, any gaseous or liquid service can be controlled. As illustrated in FIG. 14, three services are controlled in the service panel 1. In this fig, the service piping 51 represent a gas cut-off assembly 3, and two water cutoff assemblies 2, one which provides cold water to the science room while the other provides hot water. The Service Panel is of sufficient size to permit the three piping assemblies. However, by enlarging the Service Panel, a fourth or even a fifth cut-off assembly can be easily added. A virtually unlimited number of services can be controlled by the Utility Controller. These added assemblies can control services such as oxygen or nitrogen. Control wiring is field installed from a remotely located Utility Controller (not shown) through electrical conduit 29. These control wires either low voltage or line voltage are connected to secondary terminal 38. As illustrated, each solenoid 46 is wired to the corresponding terminal post. Though not shown for clarity, a door panel assembly 4 is mounted onto the Service Panel to conceal the interior apparatus.

Also, because the electronic controller is modular in nature, a series of Service Panels can be electronically linked so as to provide controlling service to a seemly unlimited number of individual services.

As before mentioned, often it is the requirement of a building that natural gas piping be sleeved. This sleeving permits potentially dangerous gas that might leak from the gas service piping to be expelled to the outside of the building. This method of installing natural gas piping is a common occurrence. As demonstrated in FIG. 13, a threaded nipple 62 is affixed to service panel 1 with two locking nuts 63. These locking nuts are common electrical lock nuts. The threaded nipple and locking nuts are of sufficient size to permit passage through the sleeving material of a natural gas service piping 51. The external sleeving which is field installed by craftsmen is typically steel or plastic pipe and fittings. The threaded nipple permits either material to be used. This alternate embodiment of the Service Panel permits this sleeving.

As is frequently the case, it is advantageous to provide a remotely located master control panel to control the services to a group of closely located science rooms. This master control service panel is typically located in a central location. The Service Panel easily adapts for such master control. As demonstrated in FIG. 15, Service Panel 1 of sufficient size houses a common backflow preventer 59. In this modified version of a water cut-off assembly 2, the solenoid 46 is positioned after the backflow preventer. The second assembly is a gas cut-off assembly 3 while the third represents another water cut-off assembly 2 providing hot water to the science room. The service piping 51 is arranged horizontally within the Service Panel. Control wiring is field installed from a remotely located Utility Controller (not shown) through electrical conduit 29. These control wires either low voltage or line voltage are connected to secondary terminal 38. As illustrated, each solenoid 46 is wired to the corresponding terminal post. Though not shown for clarity, a door panel assembly 4 is mounted onto the Service Panel to conceal the interior apparatus.

Although the main focus of discussion of the various uses of the invention have been in the realm of science classrooms and such, the Service Panel and Utility Controller have usage in many varied applications. For instance, the Utility Controller can be remotely mounted from the Service Panel; then it has the capabilities of service in a stand-alone application. In retrofitting or renovating existing facilities where there already exist the controlling solenoids and/or electrical relays, the Utility Controller replaces existing switching while leaving in place the solenoids and relays.

In other instances where electrically powered equipment such as saws, grinders, lumps and presses are utilized (e.g. within a school shop classroom), the Utility Controller can provide the same level of secured activation as that provided in the science classroom. This is accomplished by activating remote electrical relays in lieu of solenoids. Though the relays have been shown thus far as 24 VAC or 110 VAC, the electronic controller can be suited for a DC signal to be sent as well.

In instances where water or other liquids are required to be regulated and controlled with convenience as the priority rather than security, then the Utility Controller can provide this regulation and control. Such instances would be public shower facilities.

Although the description contains many specifications, these should not be construed as limiting the scope of the invention but as merely providing illustrations of some of the presently preferred embodiments of the invention. The many uses of the invention should not be limited by the examples of use here in described. Thus the scope of the invention should be determined by the appended claims and their legal equivalents, rather than by the examples given.

What is claimed is:

1. A utility control system for controlling at least one utility actuator comprising:
   an enclosure having a cover for an interior region;
   at least one utility actuator for switching between an "ON" state and "OFF" state to control the availability of a utility;
   at least one readily accessible utility switch having an "ON" position and an "OFF" position for providing ON and OFF request signals, respectively;
   a limited access switch for providing a temporary activate signal;
   control circuitry mounted within said interior region of said enclosure receiving said ON and OFF request signals and said temporary activate signal and for providing an "ON" control signal to said at least one utility actuator to switch said at least one utility actuator to said "ON" state only when both said "ON" request signal and said temporary activate signals are present at said control circuitry at the same time;
   a readily accessible emergency shut off control for providing a shut down signal to said control circuitry, and said control circuitry further adapted to provide an "OFF" control signal to said at least one utility actuator to switch said at least one utility actuator to an "OFF" state, said shut down signal continually disabling said at least one utility actuator until said utility control system is reset; and
   a reset switch mounted inside in said interior region of said enclosure for resetting said utility control system.

2. The utility control system according to claim 1 wherein said utility actuator is a normally closed solenoid valve.

3. The utility control system according to claim 1 further including an automated auxiliary monitoring system and wherein said emergency shut-off control is connected to said automated auxiliary monitoring system.

4. The utility control system according to claim 3 wherein said automated auxiliary monitoring system is a fire alarm system.

5. The utility control system according to claim 1 further including means for controlling at least one remotely located electrical relay.

6. The utility control system of claim 1 wherein said at least one actuator controls one of gas, air, oxygen, hydrogen, electrical, and water utilities.

7. The utility control system of claim 1 wherein said at least one actuator comprises at least three actuators, one each of said three actuators controlling one of gas, electricity and water utilities.

8. The utility control system of claim 7 and further comprising at least one more actuator for controlling another utility.

9. The utility control system of claim 1 wherein switching said readily accessible utility switch to an OFF condition disables said switch until again enabled by said limited access switch.

10. The utility control system of claim 1 further comprising at least one indicator showing the state of said actuators.

11. The utility control system of claim 1 wherein said emergency shut off control is mounted on said enclosure.

12. The utility control system of claim 1 wherein said limited access switch is a key switch mounted on said enclosure.

13. The utility control system of claim 1 wherein said at least one readily accessible utility switch is mounted on said enclosure.

14. The utility control system of claim 1 wherein said locking apparatus is a key actuated lock for securing said cover to said enclosure.

15. The utility control system of claim 1 wherein at least one of said utility actuators is remote from said utility controller.

16. The utility control system according to claim 15 wherein said enclosure and said at least one utility actuator are separated by gas-tight panels.

17. The utility control system of claim 1 wherein said at least one utility actuator is an electrically controlled valve.

18. The utility control system of claim 1 wherein said control circuitry provides an "ON" a control signal when enabled by an EMS (Energy Management System) signal.

19. The utility control system of claim 1 wherein activation of said emergency shut down signal sends a signal indicative of energy shut down to a central office.

20. The utility control system of claim 1 wherein said electronic circuitry comprises a state controller such that said controlled circuitry remains in a selected state until the state of the controller is changed by an input signal.

21. The utility control system of claim 1 wherein said control circuitry maintains said at least one utility actuator in the OFF state after said control system is reset following an emergency shutdown such that said at least one actuator can only be set to the "ON" state when said temporary activate signal and said "ON" request signal are again present at said control circuitry at the same time.

22. The utility control system according to claim 21 wherein said timer sets active and inactive times for said utility controller.

23. The utility control system according to claim 22 wherein said timer includes a printed circuit board having a binary logic device thereon and a programmable logic device mounted on said board and electrically connected therewith.

24. The utility control system according to claim 23 wherein said binary logic device is programmable.

25. The utility control system according to claim 24 wherein said timer delivers a direct current signal to said programmable logic device to condition said device to an active state and to withdraw said direct current signal from said programmable logic device to set said device to a shut-down state.

26. The utility control system according to claim 23 wherein said timer delivers a direct current signal to said programmable logic device to condition said device to an active state and to withdraw said direct current signal from said programmable logic device to set said device to a shut-down state.

27. The utility control system according to claim 22 wherein said timer includes means for setting active and inactive times for said service panel.

28. The utility control system of claim 1 further comprising a locking apparatus cooperating with and cover for limiting access to said interior region.

29. The utility control system of claim 1 and further comprising a service panel for housing said at least one utility actuator and said enclosure.

30. The utility control system according to claim 29 wherein said enclosure and said service panel are discrete separable modules.

31. The utility control system of claim 29 further comprising a lockable door to cover said service panel.

32. The utility control system of claim 31 wherein said emergency shut-off control is mounted on said lockable door.

33. The utility control system of claim 31 wherein said limited access switch is mounted on said lockable door.

34. The utility control system of claim 31 wherein said at least one readily accessible utility switch is mounted on said lockable door.

35. The utility control system according to claim 31 further including means for making said service panel airtight when said lockable door is closed and locked.

36. The utility control system according to claim 31 wherein said door is hinged and removeable.

37. The utility control system according to claim 36 wherein said door is gasketed.

38. The utility control system of claim 1 further comprising a timer coupled to said control circuitry and wherein said control circuitry provides an "ON" control signal when enabled by a signal from said timer.

* * * * *